(12) United States Patent
Jung et al.

(10) Patent No.: US 11,190,996 B2
(45) Date of Patent: Nov. 30, 2021

(54) METHOD AND APPARATUS FOR REPORTING SELECTED PLMN OF RRC-INACTIVE MODE UE IN NEXT-GENERATION COMMUNICATION SYSTEM

(71) Applicant: Samsung Electronics Co., Ltd., Suwon-si (KR)

(72) Inventors: Sangyeob Jung, Suwon-si (KR); Anil Agiwal, Suwon-si (KR); Jaehyuk Jang, Suwon-si (KR); Alexander Sayenko, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/573,003

(22) Filed: Sep. 17, 2019

(65) Prior Publication Data

US 2020/0092779 A1 Mar. 19, 2020

(30) Foreign Application Priority Data

Sep. 18, 2018 (KR) .................. 10-2018-0111639

(51) Int. Cl.
*H04W 36/00* (2009.01)
*H04W 36/14* (2009.01)
*H04W 76/27* (2018.01)

(52) U.S. Cl.
CPC ........ *H04W 36/14* (2013.01); *H04W 36/0011* (2013.01); *H04W 76/27* (2018.02)

(58) Field of Classification Search
None
See application file for complete search history.

(56) References Cited

U.S. PATENT DOCUMENTS 9,820,214 B2\* 11/2017 Zhang .................. H04W 48/04
2015/0215849 A1\* 7/2015 Patel ...................... H04W 48/16
455/435.2

(Continued)

FOREIGN PATENT DOCUMENTS

WO 2018-062957 A1 4/2018

OTHER PUBLICATIONS

International Search Report dated Jan. 29, 2020, issued in an International Application No. PCT/KR2019/012050.

(Continued)

*Primary Examiner* — Sithu Ko
*Assistant Examiner* — Emmanuel K Maglo
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The method by a user equipment (UE) in a wireless communication system includes reselecting another equivalent public land mobile network (PLMN) in an inactive state, transmitting, to a base station, a radio resource control (RRC) resume request message including a resume cause configured to mobile originated (mo)-signaling in case that a radio access network (RAN)-based notification area update procedure is triggered, and receiving, from the base station, an RRC resume message.

20 Claims, 22 Drawing Sheets

(56) References Cited

U.S. PATENT DOCUMENTS

| | | | | |
|---|---|---|---|---|
| 2018/0192426 A1* | 7/2018 | Ryoo | .................. | H04W 72/085 |
| 2018/0220486 A1* | 8/2018 | Tseng | .................... | H04W 76/27 |
| 2019/0320316 A1* | 10/2019 | Mildh | ................... | H04W 76/18 |
| 2019/0394691 A1* | 12/2019 | Shih | ...................... | H04W 48/18 |

OTHER PUBLICATIONS

Intel Corporation, 'Open issues on E-UTRA connected to 5GC for INACTIVE', R2-1811656, 3GPP TSG RAN WG2 Meeting #103, Aug. 10, 2018, Gothenburg, Sweden.

Interdigital Inc., 'Open Issues on NAS/AS Interaction Related to Wait Timer', R2-1809602, 3GPP TSG-RAN WG2 NR AH1807 Meeting, Jun. 22, 2018, Montreal, Canada.

Samsung, 'On UE behaviour upon going out of service', R2-1812958, 3GPP TSG RAN WG2 Meeting #103, Aug. 17, 2018, Gothenburg, Sweden.

Asustek, 'Issue of simultaneously triggering multiple RRC procedures', R2-1806920, 3GPP TSG RAN WG2 Meeting #102, May 10, 2018, Busan, Korea.

RAN WG2: "LS on inclusion of selected PLMN into the complete message", 3GPP Draft; R2-1813424, 3rd Generation Partnership Project (3GPP), Mobile Competence Centre; 650, Route Des Lucioles; F-06921 Sophia-Antipolis Cedex; FRANCE, vol. RAN WG2, No. Gothenburg, Sweden; Aug. 20, 2018-Aug. 24, 2018, (Aug. 26, 2018), XP051522941, Aug. 26, 2018.

Huawei et al: "Selected PLMN indication for RRC Inactive in RAN Sharing",3GPP Draft; R2-1812506, 3rd Generation Partnership Project (3GPP), Mobile Competence Centre; 650, Route Des Lucioles; F-06921 Sophia-Antipolis Cedex; FRANCE, vol. RAN WG2, No. Gothenburg, Sweden; Aug. 20, 2018-Aug. 24, 2018, (Aug. 10, 2018), XP051522104, Aug. 10, 2018.

Anonymous: "3rd Generation Partnership Project; Technical, Specification Group Radio Access Network; NR; User Equipment (UE) procedures in Idle mode and RRC Inactive state (Release 15)", 3GPP Standard; Technical Specification; 3GPP TS 38.304, 3rd Generation Partnership Project (3GPP), Mobile Competence Centre; 650, Route Des Lucioles; F-06921 Sophia-Antipolis Cedex; France, vol. Ran WG2, No. V15.0.0, (Jun. 20, 2018), pp. 1-25, XP051472916, Jun. 20, 2018.

European Search Report dated May 3, 2021, issued in European Application No. 19863365.3.

* cited by examiner

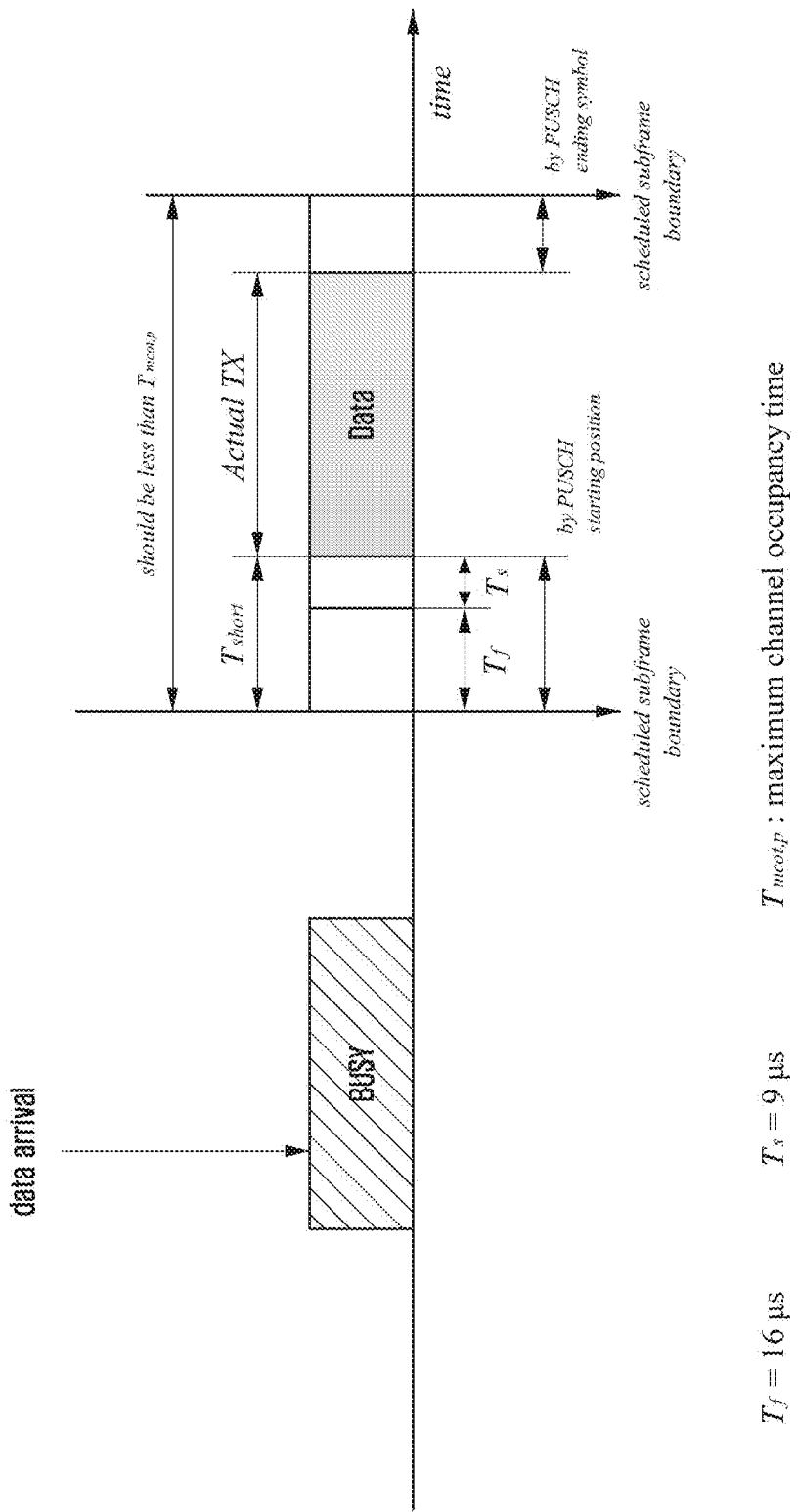

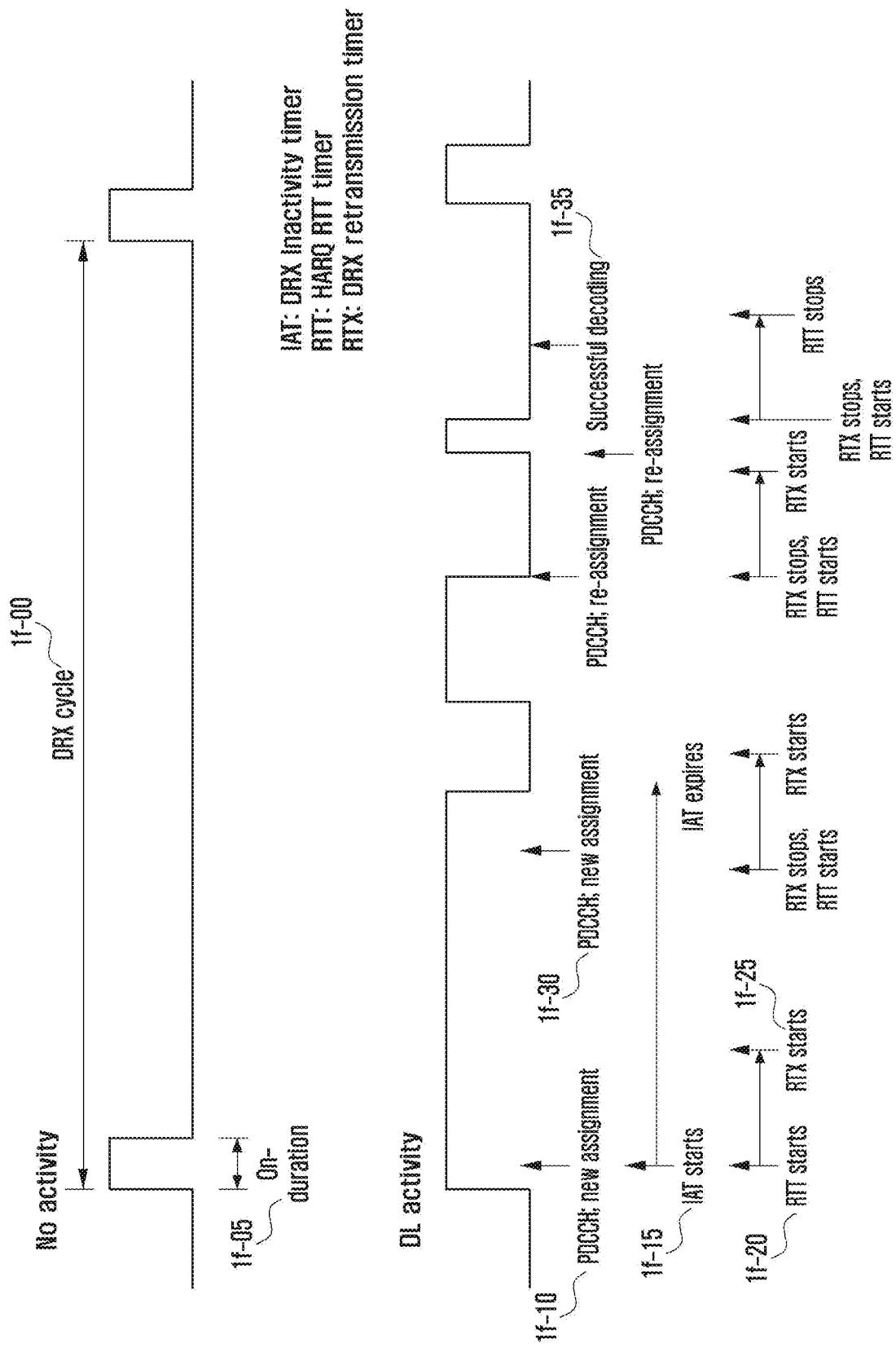

METHOD AND APPARATUS FOR REPORTING SELECTED PLMN OF RRC-INACTIVE MODE UE IN NEXT-GENERATION COMMUNICATION SYSTEM

CROSS-REFERENCE TO RELATED APPLICATION(S)

This application is based on and claims priority under 35 U.S.C. 119 of a Korean patent application number 10-2018-0111639, filed on Sep. 18, 2018, in the Korean Intellectual Property Office, the disclosure of which is incorporated by reference herein in its entirety.

BACKGROUND

1. Field

The disclosure relates to operation of a user equipment (UE) and a base station in a next-generation wireless communication system

2. Description of Related Art

Aspects of the disclosure are to address at least the above-mentioned problems and/or disadvantages and to provide at least the advantages described below. Accordingly, an aspect of the disclosure is to meet the demand for wireless data traffic having increased since deployment of 4th-Generation (4G) communication systems, efforts have been made to develop an improved 5th Generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide a method of reducing power consumption of the UE when 3GPP 5G new radio (NR) technology is used in an unlicensed band in a wireless communication system.

Another aspect of the disclosure is to provide a method by which an RRC-inactive mode UE reports a selected PLMN.

In accordance with another aspect of the disclosure, a method by a user equipment (UE) in a wireless communication system is provided. The method includes reselecting another equivalent public land mobile network (PLMN) by an inactive-state UE, transmitting, to a base station, a radio resource control (RRC) resume request message including a resume cause configured to mobile originated (mo)-signaling in case that a radio access network (RAN)-based notification area update procedure is triggered, and receiving, from the base station, an RRC resume message.

In accordance with another aspect of the disclosure, a method by a base station in a wireless communication system is provided. The method includes in case that another equivalent public land mobile network (PLMN) is reselected by an inactive-state user equipment (UE) and a radio access network (RAN)-based notification area update procedure is triggered, receiving, from a user equipment (UE), a radio resource connection (RRC) resume request message including a resume cause configured to mobile originated (mo)-signaling, and transmitting, to the UE, an RRC resume message.

In accordance with another aspect of the disclosure, a user equipment (UE) in a wireless communication system is provided. The UE includes a transceiver, and at least one processor coupled with the transceiver and configured to reselect another equivalent public land mobile network (PLMN) in an inactive state, control the transceiver to transmit, to a base station, a radio resource control (RRC) resume request message including a resume cause configured to mobile originated (mo)-signaling in case that a radio access network (RAN)-based notification area update procedure is triggered, and control the transceiver to receive, from the base station, an RRC resume message.

In accordance with another aspect of the disclosure, a base station in a wireless communication system is provided. The base station includes a transceiver, and at least one processor coupled with the transceiver and configured to: in case that another equivalent public land mobile network (PLMN) is reselected by an inactive-state user equipment (UE) and a radio access network (RAN)-based notification area update procedure is triggered, control the transceiver to receive, from a UE, a radio resource connection (RRC) resume request message including a resume cause configured to mobile originated (mo)-signaling, and control the transceiver to transmit, to the UE, an RRC resume message.

Through the disclosure, the UE can discontinuously receive signals from a base station while communicating with the gNB using a broadband frequency, thereby reducing power consumption of the UE.

Further, through the disclosure, an RRC-inactive mode UE can efficiently report a selected PLMN.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1E illustrates LBT type 2 method according to an embodiment of the disclosure;

FIG. 1F illustrates DRB operation of NR according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For convenience of the description below, the disclosure uses terms and names defined in LTE and NR standards, which are the latest standards defined by the 3rd generation partnership project (3GPP) organization, among the existing communication standards. However, the disclosure is not limited by the terms and names, and may be equally applied to systems according to other standards. Particularly, the disclosure may be applied to 3GPP NR (5th generation mobile communication standard).

Figure 1A:
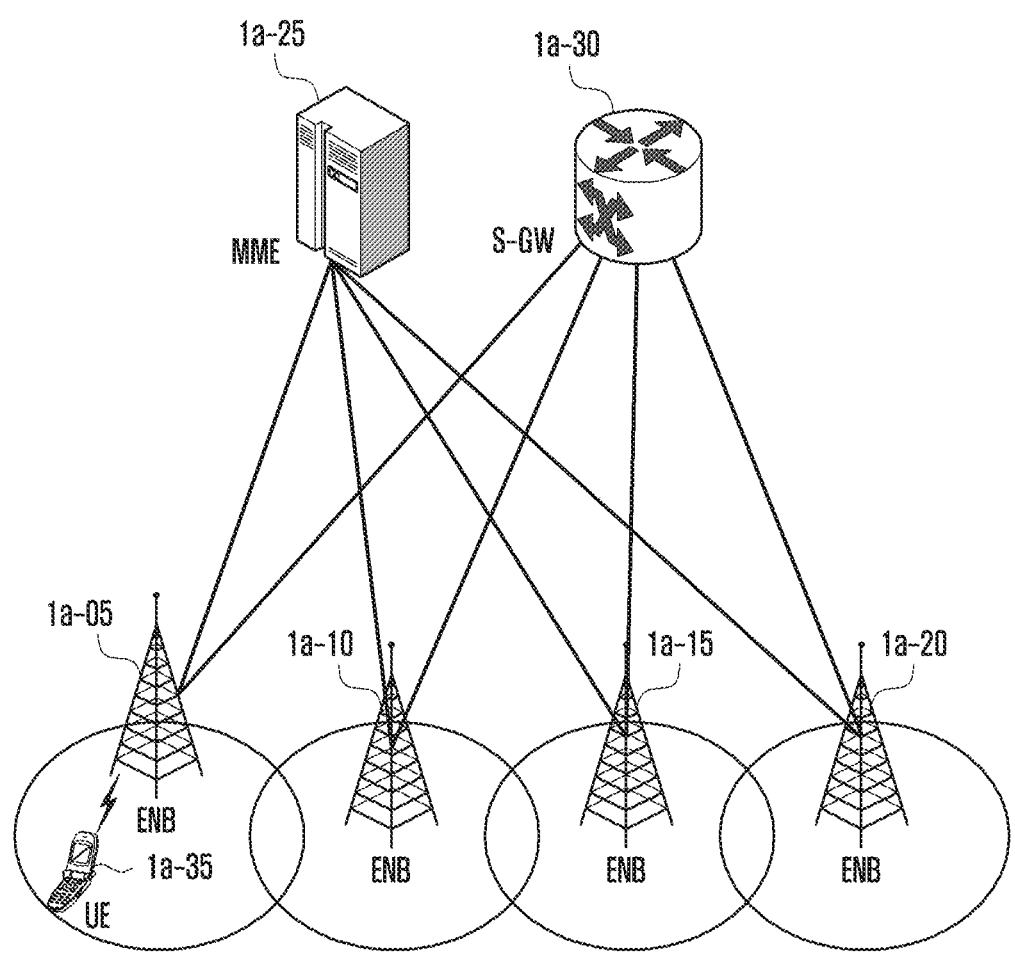
FIG. 1A illustrates a structure of an LTE system for reference to describe according to an embodiment of the disclosure.

FIG. 1A illustrates a structure of an LTE system for reference to describe the disclosure. An NR system has a similar structure according to an embodiment of the disclosure.

Referring to FIG. 1A, a wireless communication system includes a plurality of eNBs 1a-05, 1a-10, 1a-15, and 1a-20, a mobility management entity (MME) 1a-25, and a serving-gateway (S-GW) 1a-30. A user equipment (hereinafter, a UE or a terminal) 1a-35 accesses an external network through the eNBs 1a-05, 1a-10, 1a-15, and 1a-20 and the S-GW 1a-30.

The eNBs 1a-05, 1a-10, 1a-15, and 1a-20 are access nodes of a cellular network and provide a wireless connection to UEs accessing the network. That is, the eNBs 1a-05, 1a-10, 1a-15, and 1a-20 perform scheduling by collecting state information, such as channel states, available transmission power states, and buffer states of the UEs, to service traffic of users, and support connection between the UEs and a core network (CN).

The MME 1a-25 corresponds to a device which is responsible for various control functions including a mobility management function for a UE and is connected to a plurality of eNBs, and the S-GW 1a-30 corresponds to a device which provides a data bearer. In addition, the MME 1a-25 and the S-GW 1a-30 may further perform authentication, bearer management, and the like for a UE accessing a network, and processes a packet arrived from the eNBs 1a-05, 1a-10, 1a-15, and 1a-20 or a packet to be transferred to the eNBs 1a-05, 1a-10, 1a-15, and 1a-20.

Figure 1B:
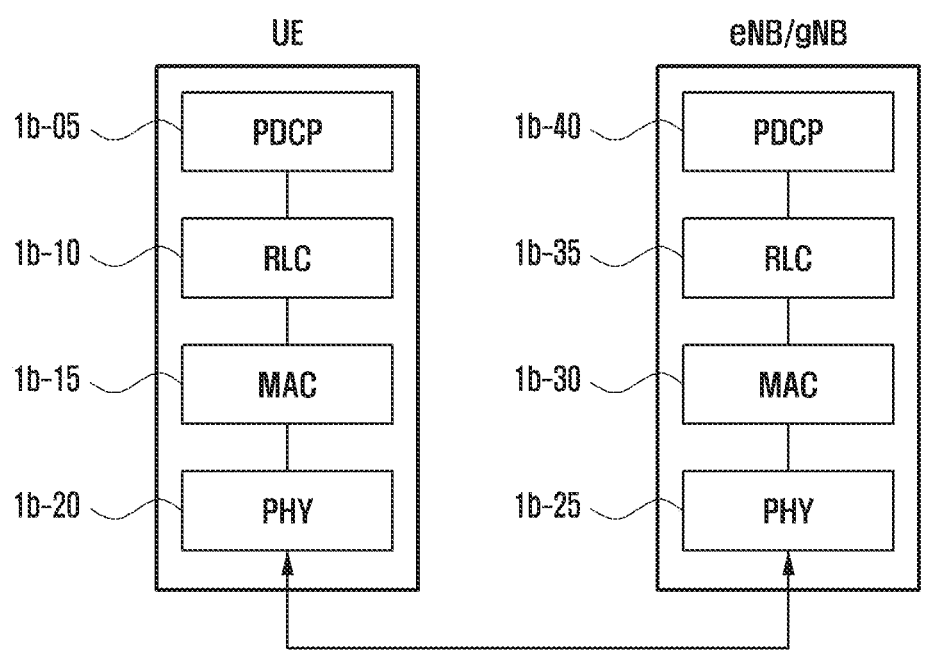
FIG. 1B illustrates a wireless protocol structure in LTE and NR systems for reference to describe according to an embodiment of the disclosure.

FIG. 1B illustrates a wireless protocol structure in LTE and NR systems for reference to describe according to an embodiment of the disclosure.

Referring to FIG. 1B, in relation to a wireless protocol structure of an LTE system, each of a UE and an eNB includes a packet data convergence protocol (PDCP) layer 1b-05 or 1b-40, a radio link control (RLC) layer 1b-10 or 1b-35, and a medium access control (MAC) layer 1b-15 or 1b-30. The packet data convergence protocol (PDCP) layer 1b-05 or 1b-40 is responsible for IP header compression/decompression, and the radio link control (hereinafter, referred to as RLC) layer 1b-10 or 1b-35 reconfigures PDCP packet data units (PDCP PDUs) to a proper size.

The MAC layer 1b-15 or 1b-30 is connected to several RLC-layer devices configured in one UE, and performs an operation of multiplexing RLC PDUs to a MAC PDU and demultiplexing RLC PDUs from a MAC PDU.

Physical layers 1b-20 and 1b-25 channel-code and modulate higher layer data into OFDM symbols and transmit the OFDM symbols through a wireless channel, or demodulate and channel-decode OFDM symbols received through the wireless channel to transfer the OFDM symbols to a higher layer. In addition, for additional error correction, hybrid ARQ (HARQ) is used in the physical layers, and a receiver side transmits 1-bit information indicating whether a packet transmitted by a transmitter side is received. This information is referred to as HARQ ACK/NACK information. Downlink HARQ ACK/NACK information for uplink data transmission may be transmitted through a physical hybrid-ARQ indicator channel (PHICH) in case of the LTE system. In case of an NR system, it can be determined whether retransmission is required or new transmission is enough, through scheduling information of a corresponding UE in a physical downlink control channel (PDCCH) which is a channel through which downlink/uplink resource allocation is transmitted. This is because asynchronous HARQ is applied in the NR system.

Uplink HARQ ACK/NACK information for downlink data transmission may be transmitted through a physical uplink control channel (PUCCH) or a physical uplink shared channel (PUSCH). The PUCCH is generally transmitted in an uplink resource of a PCell which is to be described later. However, if there is a support by a PUCCH, the PUCCH may be additionally transmitted through an SCell which is to be described later. This SCell is referred to as a PUCCH SCell.

Although not illustrated, a radio resource control (RRC) layer exists above a PDCP layer of each of a UE and an eNB, and the radio resource control (RRC) layer may transmit and receive an access- and measurement-related configuration control message to control radio resources.

Meanwhile, the PHY layer may include one or a plurality of frequencies/carriers, and a technique of simultaneously configuring and using a plurality of frequencies is called a carrier aggregation technique (hereinafter, referred to as CA). Only one carrier was used for communication between a terminal (or UE) and an e-utran nodeB, (eNB) in the past, but the CA technique can significantly increase the transmission amount as much as the number of subcarriers by additionally using a main carrier and one or more subcarriers. Meanwhile, in the LTE system, a cell in an eNB using a main carrier is referred to as a main cell or a primary cell (PCell), and a cell in an eNB using a subcarrier is referred to as a sub-cell or a secondary cell (SCell).

Figure 1C:
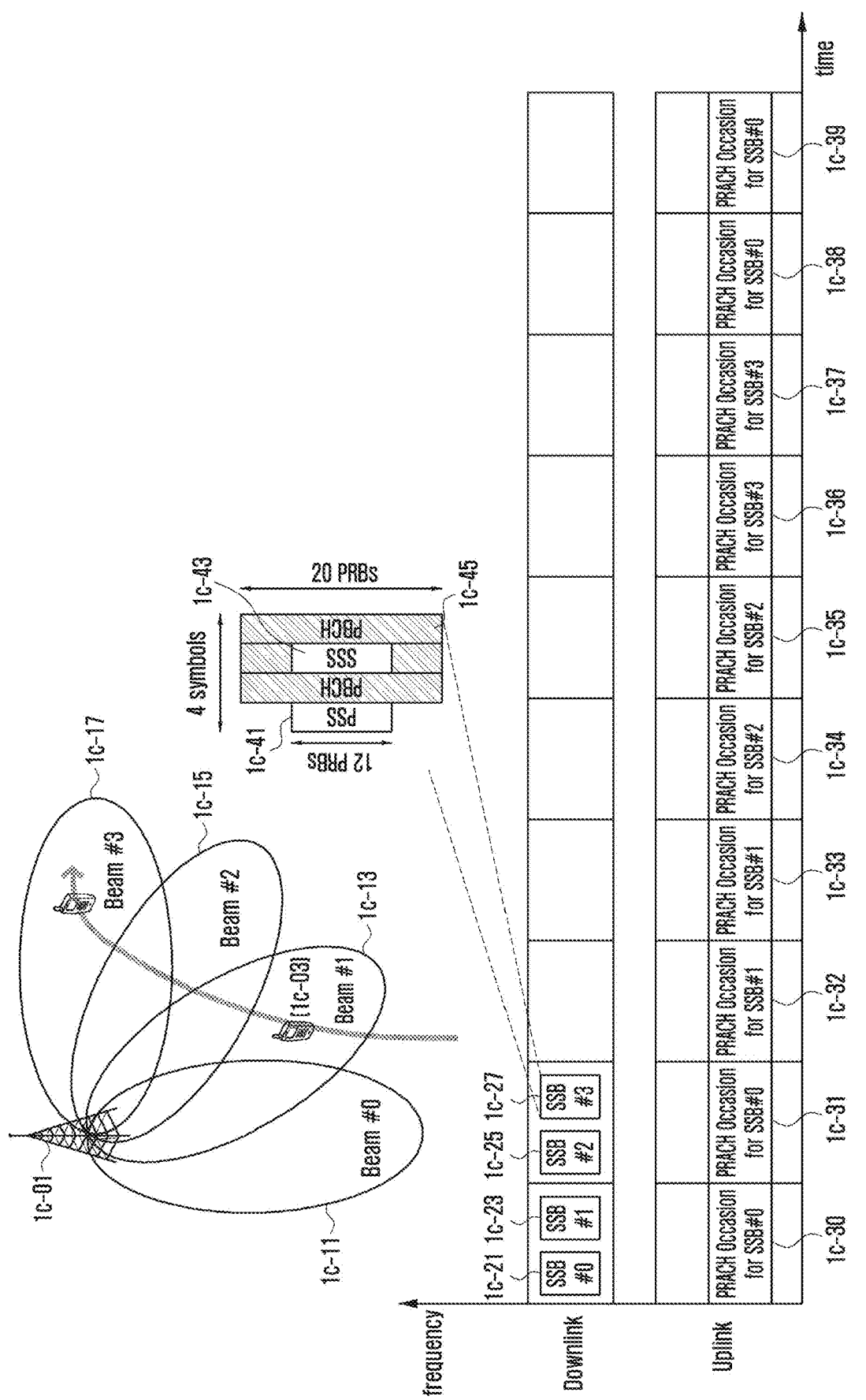
FIG. 1C illustrates an example of downlink and uplink channel frame structures in beam-based communication of an NR system according to an embodiment of the disclosure.

FIG. 1C illustrates an example of downlink and uplink channel frame structures in beam-based communication of an NR system according to an embodiment of the disclosure.

Referring to FIG. 1C, an eNB 1c-01 transmits a signal in the form of beams 1c-11, 1c-13, 1c-15, and 1c-17 to transmit wider coverage or a stronger signal. Accordingly, a UE 1c-03 in a cell is required to transmit and receive data by using a specific beam (beam #1 1c-13 in FIG. 1C) transmitted by the eNB.

Meanwhile, depending on whether the UE is connected to the eNB, the status of the UE is divided into an idle mode (RRC_IDLE) and a connected mode (RRC_CONNECTED). Accordingly, the eNB does not recognize location of the UE in the idle mode.

If the UE in the idle mode is to be shifted to the connected mode, the UE may receive synchronization signal blocks (SSBs) 1c-21, 1c-23, 1c-25, and 1c-27 transmitted by the eNB. The SSBs are transmitted periodically according to a cycle configured by the eNB, and each of the SSBs may include a primary synchronization signal (PSS) 1c-41, a secondary synchronization signal (SSS) 1c-43, and a physical broadcast channel (PBCH) 1c-45.

In FIG. 1C, a scenario in which an SSB is transmitted for each beam is assumed. For example, it is assumed that SSB #0 1c-21 is transmitted using beam #0 1c-11, SSB #1 1c-23 is transmitted using beam #1 1c-13, SSB #2 1c-25 is transmitted using beam #2 1c-15, and SSB #3 1c-27 is transmitted using beam #3 1c-17. In FIG. 1C, it is assumed that the UE in the idle mode is located in beam #1. However, if the UE in the connected mode performs random access, the UE selects an SSB received at the time of performing random access.

Accordingly, in FIG. 1C, the UE receives SSB #1 transmitted through beam #1. If SSB #1 is received, the UE acquires a physical cell identifier (PCI) of the eNB through a PSS and an SSS, and receives a PBCH, so that the UE may identify an identifier (i.e., #1) of the currently received SSB, a location at which the SSB is currently received within a 10 ms frame, and a system frame number (SFN) having a cycle of 10.24 seconds in which the SSB is located. In addition, the PBCH may include a master information block (MIB), and the MIB may include information on where to receive system information block type 1 (SIB1) for broadcasting more detailed configuration information of the cell.

If the SIB1 is received, the UE may identify the total number of SSBs transmitted by the eNB and may identify location (assuming a scenario in which a PRACH occasion is allocated every 1 ms in FIG. 1C: 1c-30 to 1c-39) of physical random access channel (PRACH) occasions in which the UE may perform random access to be shifted to the connected mode (more precisely, may transmit a preamble which is a physical signal specifically designed for uplink synchronization). In addition, the UE may identify a PRACH occasion among the PRACH occasions and an SSB index, based on the information, wherein the PRACH occasion is mapped to the SSB index. For example, in FIG. 1C, a scenario in which a PRACH occasion is allocated every 1 ms and a scenario in which a halt of an SSB is allocated per PRACH occasion (that is, two PRACH occasions per SSB) are assumed. Accordingly, a scenario in which two PRACH occasions are allocated for each SSB from a PRACH occasion starting according to an SFN value is illustrated. That is, PRACH occasions 1c-30 and 1c-31 may be allocated for SSB #0, and PRACH occasions 1c-32 and 1c-33 may be allocated for SSB #1. After PRACH occasions are allocated for all SSBs, PRACH occasions 1c-38 and 1c-39 are allocated for the first SSB.

Accordingly, the UE identifies locations of the PRACH occasions 1c-32 and 1c-33 for SSB #1, and transmits a random access preamble at the currently earliest PRACH occasion between the PRACH occasions 1c-32 and 1c-33 corresponding to SSB #1 (for example, 1c-32).

Since the eNB has received the preamble at the PRACH occasion 1c-32, it can be seen that the corresponding UE has transmitted the preamble by selecting SSB #1. Accordingly, data may be transmitted and received through the corresponding beam when subsequent random access is performed.

Meanwhile, when the UE in the connected mode moves from the current (source) eNB to a target eNB due to handover, etc., the UE performs random access at the target eNB and selects an SSB as described above to perform an operation of transmitting a random access preamble. In addition, during handover, a handover command is transmitted to the UE to allow the UE to move from the source eNB to the target eNB. In this case, the message may include a corresponding UE dedicated random access preamble identifier allocated to each SSB of the target eNB to enable use of the identifier when the UE performs random access at the target eNB. The eNB may not allocate a dedicated random access preamble identifier for all beams (depending on the current location of the UE, etc.), and some SSBs may not be allocated a dedicated random access preamble (for example, allocation of a dedicated random access preamble to Beam #2 and Beam #3 only).

If a dedicated random access preamble is not allocated to an SSB selected by the UE for preamble transmission, the UE randomly selects a contention-based random access preamble to perform random access. For example, in FIG. 1C, after the UE is located in Beam #1 and first performs random access but fails, the UE may be located in Beam #3 to transmit a dedicated preamble when transmitting a random access preamble again. That is, even in one random access procedure, if preamble retransmission is performed, a contention-based random access procedure and a contention-free random access procedure may be mixed depending on whether a dedicated random access preamble is allocated to a selected SSB for each preamble transmission.

Meanwhile, a scenario in which the UE operates in an unlicensed band in the above-mentioned 5th Generation (5G) system may be considered. The unlicensed band means a frequency band that anyone can use freely without a separate license in the regulatory allowance at a corresponding frequency. For example, the unlicensed band includes a 2.4 GHz, 5 GHz band, or the like, and a wireless LAN and Bluetooth perform communication by using a corresponding frequency.

Meanwhile, in order to perform communication in the unlicensed band, data is required to be transmitted and received according to regulations established for each country. More specifically, according to the above regulations, before a communication device performs transmission in an unlicensed band, the communication device "listens" to and identifies whether a corresponding unlicensed band is occupied by another communication device, and then if it is determined that the corresponding unlicensed band is empty, the communication device is required to perform "transmission". As such, a scheme of listening to a corresponding band and transmitting a signal when the corresponding band is empty is referred to as listen-before-talk (LBT). Each country and unlicensed band has regulations required to carry out the LBT, and a communication device is required to perform the LBT when communicating in an unlicensed band according to the regulations.

There are two main types of the LBT, such as Type 1 and Type 2.

Figure 1D:
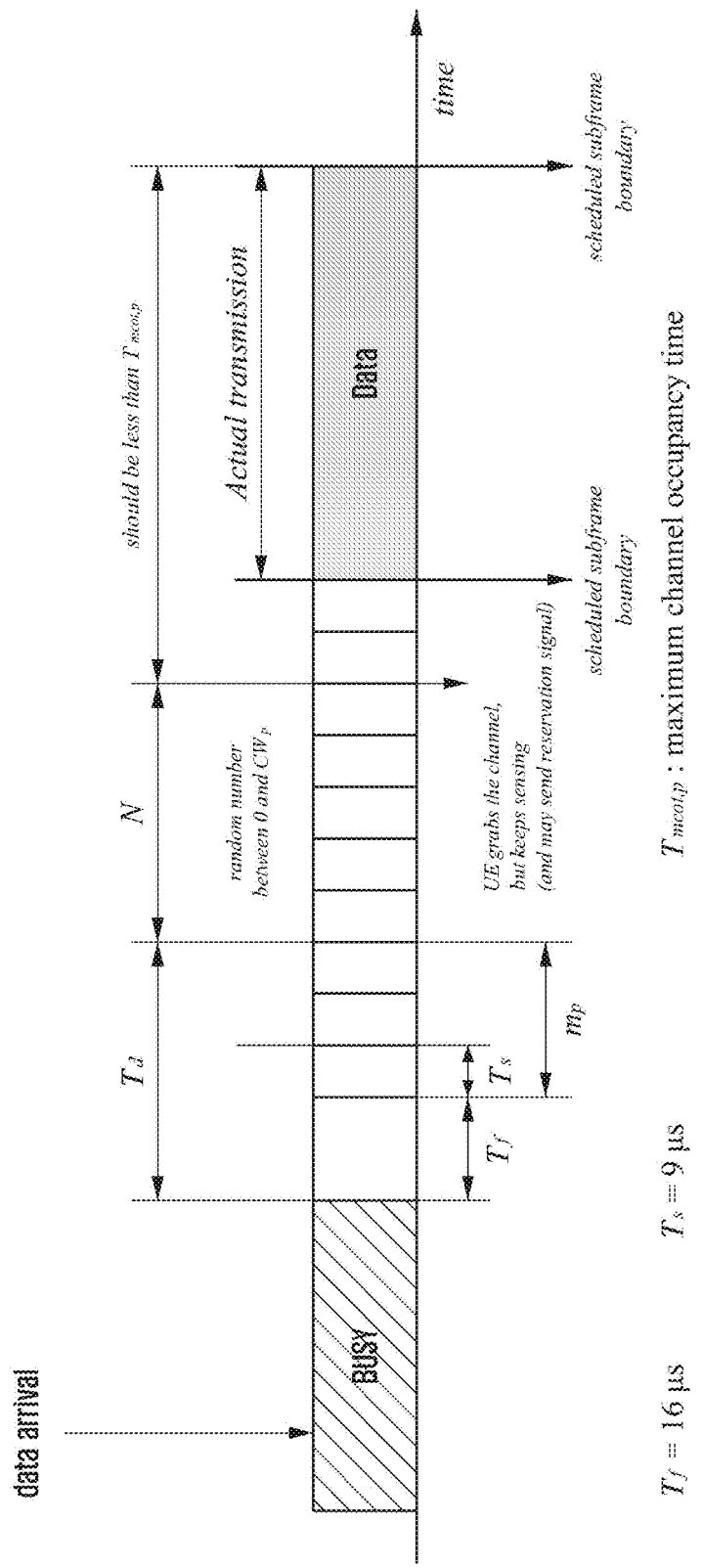
FIG. 1D illustrates LBT type 1 method according to an embodiment of the disclosure.

FIG. 1D illustrates LBT Type 1 method according to an embodiment of the disclosure.

Referring to FIG. 1D, LBT Type 1 corresponds to a method in which a device randomly determines a time at which the device determines whether other peripheral devices transmit a signal through a corresponding unlicensed band before transmitting a signal, and transmits a signal when a channel is empty during the corresponding random time. In this case, the device determines whether a corresponding unlicensed band is used for a fixed time ($T_d$), and determines whether a channel is empty (unused) for a random time (N) when the corresponding unlicensed band is empty (unused).

In this case, a method for determining values of the $T_d$ and N may be changed according to the priority and importance of traffic and, for example, there may be four determination methods. The priority of the method for determining the $T_d$ and N values may be determined according to the priority and importance of the traffic, which is referred to as a channel access priority class (CAPC).

Parameters such as $m_p$, $CW_{min,p}$, and $CW_{max,p}$ may be determined according to the CAPC. In order to determine whether a unlicensed band is occupied, a predetermined time $T_d$ has a time length of $T_d$=16+$m_p$*9 (μs), an N has a time length of N=random (0, $CW_p$)*9 (μs), and a CW value starts from $CW_{min, p}$, is nearly doubled every time when transmission fails, and has a maximum value of $CW_{max, p}$.

For example, if the CAPC is 3, the Td has a length of 16+3*9=43 μs. In addition, an N μs may be determined by multiplying a random value (for example, 7) selected from 0 to 15 by 9 in case of the initial transmission (for example, N is 7*9=63 μs in case where the random value is 7. Therefore, according to the embodiment, the communication device may determine whether a channel is occupied for 106 μs and transmit a signal when the channel is empty.

TABLE 1

| Channel Access Priority Class (p) | $m_p$ | $CW_{min, p}$ | $CW_{max, p}$ | $T_{mcot, p}$ | allowed $CW_p$ sizes |
|---|---|---|---|---|---|
| 1 | 1 | 3 | 7 | 2 ms | (3, 7) |
| 2 | 1 | 7 | 15 | 3 ms | (7, 15) |
| 3 | 3 | 15 | 63 | 8 or 10 ms | (15, 31, 63) |
| 4 | 7 | 15 | 1023 | 8 or 10 ms | (15, 31, 63, 127, 255, 511, 1023) |

According to the above example (when 7 is selected as a random value for an N), when it is determined that a channel is occupied by another device (that is, a received signal strength (RSSI) is equal to or greater than a predetermined threshold value) in the middle of determining whether the channel is empty (for example, when 3 out of 7 passes and 4 remains), a UE waits until the channel occupancy ends, and then waits for $T_d$ again and determines whether the channel is empty for the remaining time of 4 to perform transmission.

As can be seen in Table 1, an LBT scheme having a low CAPC is used when high priority traffic is transmitted.

FIG. 1E illustrates LBT Type 2 method according to an embodiment of the disclosure.

Referring to FIG. 1E, LBT Type 2 corresponds to a method in which a time at which a device determines whether other peripheral devices transmit a signal through a corresponding unlicensed band before transmitting a signal is fixed, and accordingly, the device immediately transmits a signal when a channel is empty for the corresponding fixed time.

That is, in FIG. 1E, the method corresponds to a scheme in which, when a communication device is required to transmit, if the device listens to (senses) a channel for a fixed time of $T_{short}$ (=$T_f$+$T_s$) and determines that the channel is empty, the device transmits a signal immediately. That is, the scheme corresponds to an LBT scheme which can be used when a signal having a very high priority is transmitted.

FIG. 1F illustrates discontinuous reception (hereinafter, referred to as DRX) operation of an NR UE according to an embodiment of the disclosure.

Referring to FIG. 1F, the DRX corresponds to a method for monitoring only some PDCCHs according to configuration information received from an eNB, instead of monitoring all physical downlink control channels (PDCCHs) to enable a UE to obtain scheduling information in order to minimize power consumption of the UE.

A basic DRX operation has a DRX cycle 1f-00 and monitors a PDCCH only for an OnDuration 1f-05 time. In a connected mode, two values of a long DRX and a short DRX are configured in the DRX cycle. In a general case, the long DRX cycle is applied, and if necessary, the eNB may additionally configure the short DRX cycle. If both the long DRX cycle and short DRX cycle are configured, the UE starts a short DRX timer and repeats the same from the short DRX cycle at the same time. If there is no new traffic until after the short DRX timer expires, the UE changes from the short DRX cycle to the long DRX cycle.

If scheduling information related to a new packet is received through a PDCCH in operation 1f-10 during the OnDuration 1f-05 time, the UE starts a DRX inactivity timer in operation 1f-15. The UE maintains an active state during the DRX inactivity timer. That is, the UE continues to monitor the PDCCH. In addition, the UE also starts a HARQ RTT timer in operation 1f-20. The HARQ RTT timer is applied to prevent the UE from unnecessarily monitoring the PDCCH during a HARQ round trip time (RTT), and the UE is not required to perform PDCCH monitoring during an operation time of the timer. However, while the DRX inactivity timer and the HARQ RTT timer are simultaneously operated, the UE continues to perform PDCCH monitoring with reference to the DRX inactivity timer. If the HARQ RTT timer expires, a DRX retransmission timer is started in operation 1f-25. While the DRX retransmission timer is operated, the UE is required to perform PDCCH monitoring.

In general, during the DRX retransmission timer operation time, scheduling information for HARQ retransmission is received in operation 1f-30. If the scheduling information is received, the UE immediately stops the DRX retransmission timer and starts the HARQ RTT timer again. The above operation continues until the packet is successfully received in operation 1f-35. In addition, if the eNB has no data anymore to transmit to a corresponding UE while the UE operates the OnDuration or DRX inactivity timer, the eNB may transmit a DRX Command MAC CE message. The UE having received the message stops both the OnDuration timer and the DRX inactivity timer which are in operation, and the UE uses a short DRX cycle first when the short DRX is configured, and uses a long DRX cycle when only the long DRX is configured.

Meanwhile, when the eNB operates in the unlicensed band as described in FIGS. 1D and 1E, the eNB is required to perform LBT in order to transmit scheduling information to the UE. If the eNB performs LBT and fails to perform the LBT during the above-mentioned OnDuration even though there is data to be transmitted, the UE sleeps until the next OnDuration and the eNB is required to delay the corresponding transmission to the next OnDuration. As such, if the existing DRX operation is used, a delay occurs when the LBT fails during the OnDuration. In addition, there is a problem that the eNB is required to retain data in a very large buffer to avoid data loss.

Accordingly, the disclosure proposes a method and device for solving the above problem.

Figure 1G:
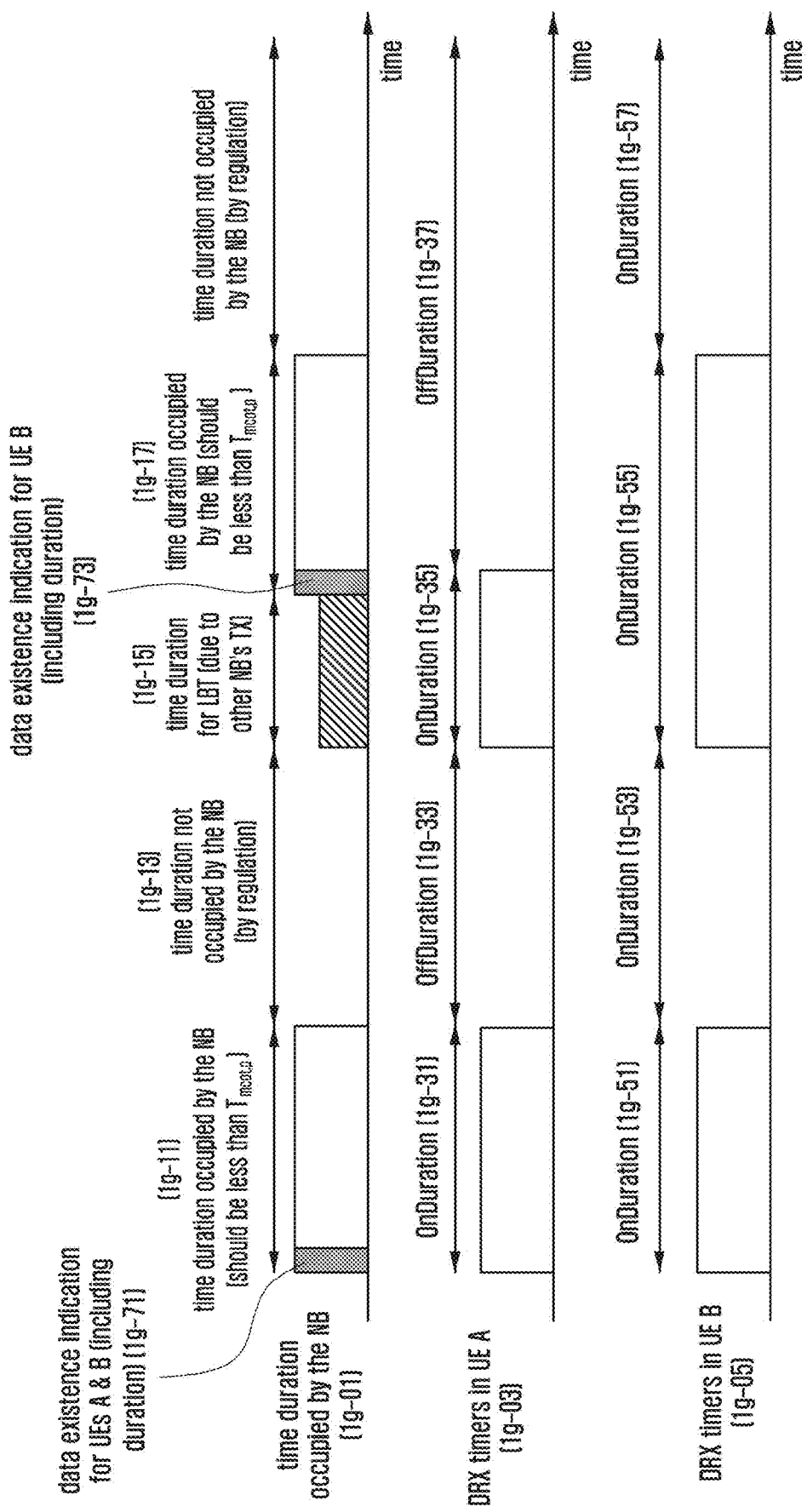
FIG. 1G illustrates a first DRX operation used by a UE operating in an unlicensed band according to an embodiment of the disclosure.

FIG. 1G illustrates a first DRX operation used by a UE operating in an unlicensed band according to an embodiment of the disclosure.

Referring to FIG. 1G, graph 1g-01 illustrates that an eNB operating in an unlicensed band occupies a channel and transmits data to UEs which have accessed the corresponding eNB. In addition, graph 1g-03 illustrates a time when UE A monitors a PDCCH, and graph 1g-05 illustrates a time when UE B monitors a PDCCH.

Referring to graph 1g-01, if the eNB occupies a channel, the eNB transmits, to UEs in a cell, occupancy time duration for an occupancy period 1g-11 and a list of the UEs to be scheduled during the occupancy time duration by using a broadcast message in operation 1g-71. Otherwise, the broadcast message may be a unicast message transmitted to each individual UE. In this case, the message may include information on whether scheduling is performed and occupancy time duration.

The message transmitted by the eNB in operation 1g-71 may be transmitted through a message of an RRC layer, or may be transmitted through a MAC control element (CE) which is a MAC layer control message.

FIG. 1G illustrates an example in which an instruction indicating that there is data to be transmitted to the UE A and the UE B (that is, an indication that both the UE A and the UE B should be awake) is transmitted through the message of operation 1g-71. Accordingly, each of the UE A and the UE B may monitor a PDCCH while waking up during a corresponding occupancy period, based on occupancy time duration indicated by the eNB, in operations 1g-31 and 1g-51.

Thereafter, when the corresponding occupancy period ends, each of the UEs does not monitor the PDCCH for a fixed time or a value configured by the eNB in operations 1g-33 and 1g-53. This is because once the eNB has occupied a channel in operation 1g-11, a predetermined time 1g-13 is required to occupy the channel again (a predetermined time for occupying the channel again may be determined by regulations established by each country). Accordingly, since the eNB cannot occupy the channel during the corresponding time, the UE is not required to monitor the PDCCH. In FIG. 1G, the period is referred to as OffDuration in operations 1g-33 and 1g-53.

After the corresponding OffDuration has passed (or when a timer corresponding to the OffDuration has expired), the UE starts PDCCH monitoring in operations 1g-35 and 1g-55. Meanwhile, other communication devices or other eNBs around the eNB may occupy the unlicensed band in operation 1g-15. Therefore, if the channel becomes empty after operation 1g-15, the eNB may occupy the channel again in operation 1g-17.

When the eNB occupies the channel again, as in operation 1g-71, the eNB transmits occupancy time duration and a list of UEs to be scheduled during the occupancy time duration by using a broadcast or unicast message in operation 1g-73.

FIG. 1G illustrates a scenario in which only the UE B is scheduled in an occupancy period 1g-17.

Therefore, the UE A having received the message 1g-73 is not required to perform PDCCH monitoring even during a time 1g-17 when the eNB occupies the channel in operation 1g-37, and is not required to continuously perform PDCCH monitoring until a period after the eNB cannot occupy the channel in operation 1g-37.

In addition, since the UE B has received that the eNB can be scheduled in the occupancy period, the UE B continuously monitors the PDCCH during the occupancy period 1g-17 in operation 1g-55.

Meanwhile, if there is no message indicating whether data exists, such as 1g-71 and 1g-73, or the UE does not receive the message, the UE assumes that data exists during the period and continuously monitors the PDCCH for predetermined time duration (for example, $T_{mcot,p}$ described in Table of FIG. 1D).

Accordingly, the UE can discontinuously perform PDCCH monitoring, thereby reducing power consumption of the UE.

Figure 1H:
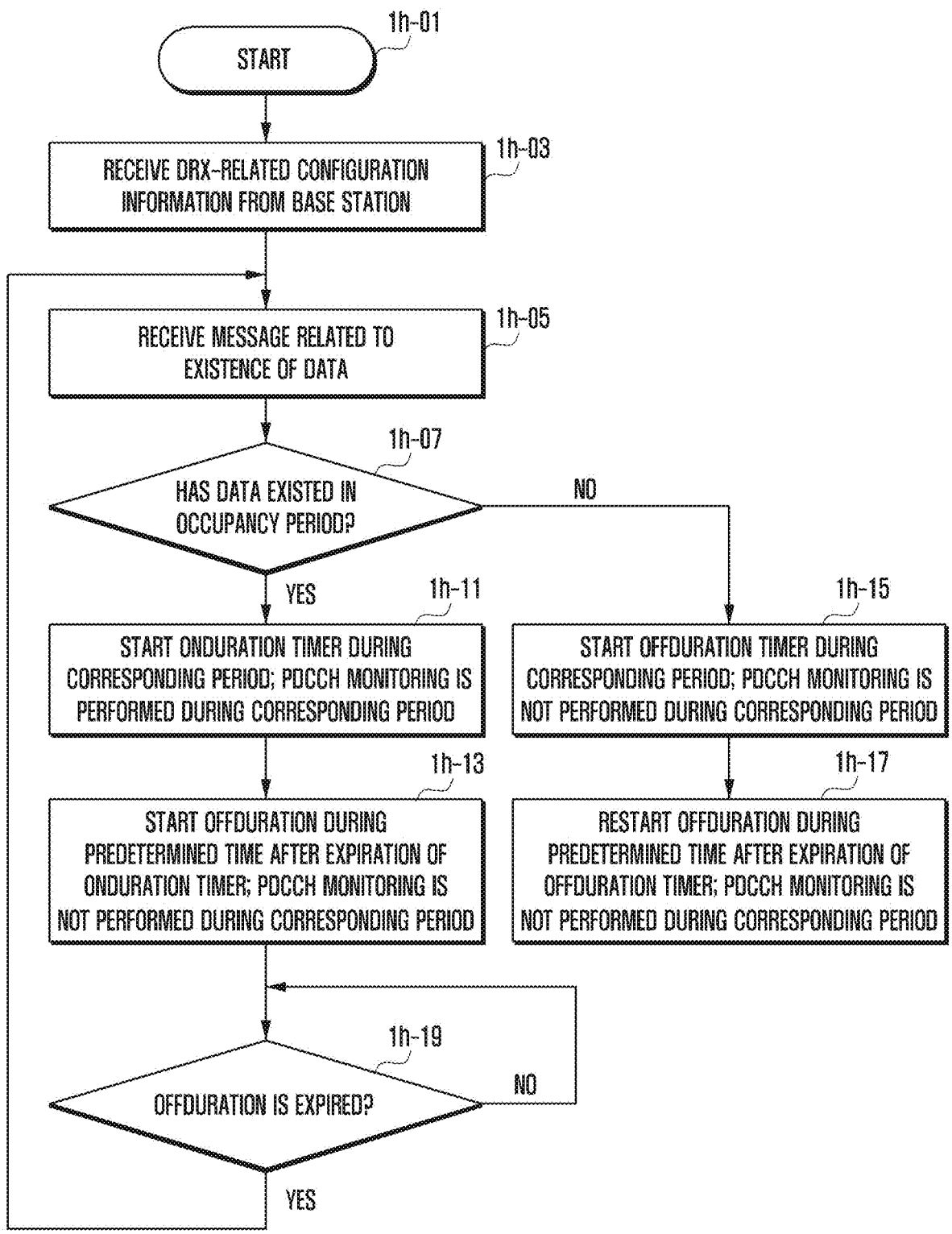
FIG. 1H illustrates the operation order of the UE when the first DRX operation used by the UE operating in the unlicensed band is performed according to an embodiment of the disclosure.

FIG. 1H illustrates an operation order of a UE operating in an unlicensed band when the UE performs a first DRX operation according to an embodiment of the disclosure.

Referring to FIG. 1H, in an embodiment of the disclosure, it is assumed that the UE is already successfully connected to the eNB and is in an RRC connected state (RRC_CONNECTED) capable of transmitting and receiving data in operation 1h-01. Thereafter (or when the UE is switched to the connected state), the UE may receive DRX-related configuration information from the eNB in operation 1h-03. The configuration information may include the above-described DRX-related parameter, for example, duration of an OffDuration timer.

Thereafter, the UE monitors a PDCCH to receive data from the eNB, and receives a message related to the existence of data, such as 1g-71 and 1g-73 above-described in FIG. 1G, in operation 1h-05. If the message is received, the UE determines whether the eNB schedules data to the UE in the occupancy period 1g-11 and 1g-17 in operation 1h-07.

If the eNB informs the UE to schedule data in the occupancy period, the UE may start an OnDuration timer according to occupancy time duration during the occupancy period, and may continuously monitor a PDCCH during the corresponding period in operation 1h-11. The UE may receive downlink data according to a result of the PDCCH monitoring.

If the OnDuration timer expires, the UE starts an OffDuration timer as in period 1g-33 of FIG. 1G, and the UE is not required to monitor the PDCCH during the operation time of the corresponding timer in operation 1h-13.

If the eNB informs the UE not to schedule data in the occupancy period, the UE stops the OnDuration timer when the timer has been operated, the UE may start the OffDuration timer according to the time duration of the occupancy period. Accordingly, the UE is not required to monitor the PDCCH during the corresponding period in operation 1h-15.

If the OffDuration timer expires, the UE restarts the OffDuration timer corresponding the period 1g-37 of FIG. 1G, and the UE is not required to monitor the PDCCH during the operation time of the corresponding timer in operation 1h-17.

Thereafter, if the OffDuration timer expires in operation 1h-19, the UE monitors the PDCCH and attempts to receive a message related to the existence of data in operation 1h-05. In this case, the UE may start the OnDuration timer having a predetermined length (for example, infinity), or continuously perform PDCCH monitoring without starting the timer.

Through above operation, the UE can discontinuously perform PDCCH monitoring, thereby reducing power consumption of the UE.

Figure 1I:
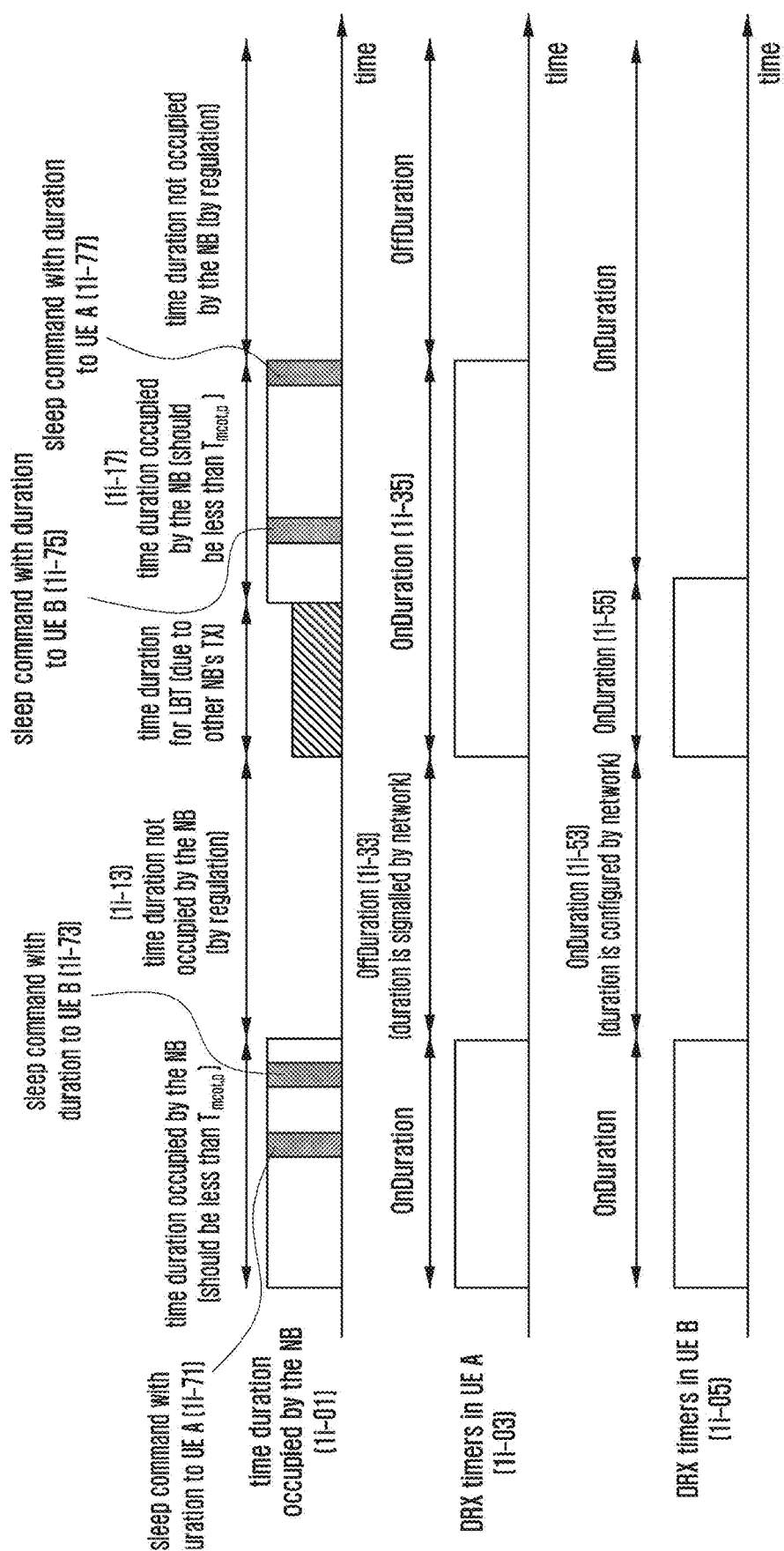
FIG. 1I illustrates a second DRX operation used by the UE operating in the unlicensed band according to an embodiment of the disclosure.

FIG. 1I illustrates a second DRX operation used by a UE operating in an unlicensed band according to an embodiment of the disclosure.

Referring to FIG. 1I, graph 1i-01 illustrates that an eNB operating in an unlicensed band occupies a channel and transmits data to UEs which have accessed the corresponding eNB. In addition, graph 1i-03 illustrates a time when UE A monitors a PDCCH, and graph 1i-05 illustrates a time when UE B monitors the PDCCH.

A DRX second operation according to the disclosure proposes a method in which the UE always monitors a PDCCH, but if the eNB is unable to occupy a channel as in operations 1i-13 and 1i-17 or the eNB has no data anymore to transmit to the UE, the UE is not allowed to perform PDCCH monitoring during an indicated time.

The eNB informs the UE not to monitor the PDCCH during an indicated time by using a broadcast message or a unicast message in operations 1i-71 and 1i-73. The message may be an RRC layer message, a MAC CE message, or a message transmitted by including an RNTI specific to a PDCCH.

Accordingly, the UE operates an OffDuration timer so as not to monitor the PDCCH during the indicated time after receiving the message in operations 1i-33 and 1i-53.

If the OffDuration timer expires, the UE monitors the PDCCH in operations 1i-35 and 1i-55 until the UE receives the message from the eNB in operations 1i-75 and 1i-77.

Accordingly, the UE can discontinuously perform PDCCH monitoring, thereby reducing power consumption of the UE.

Figure 1J:
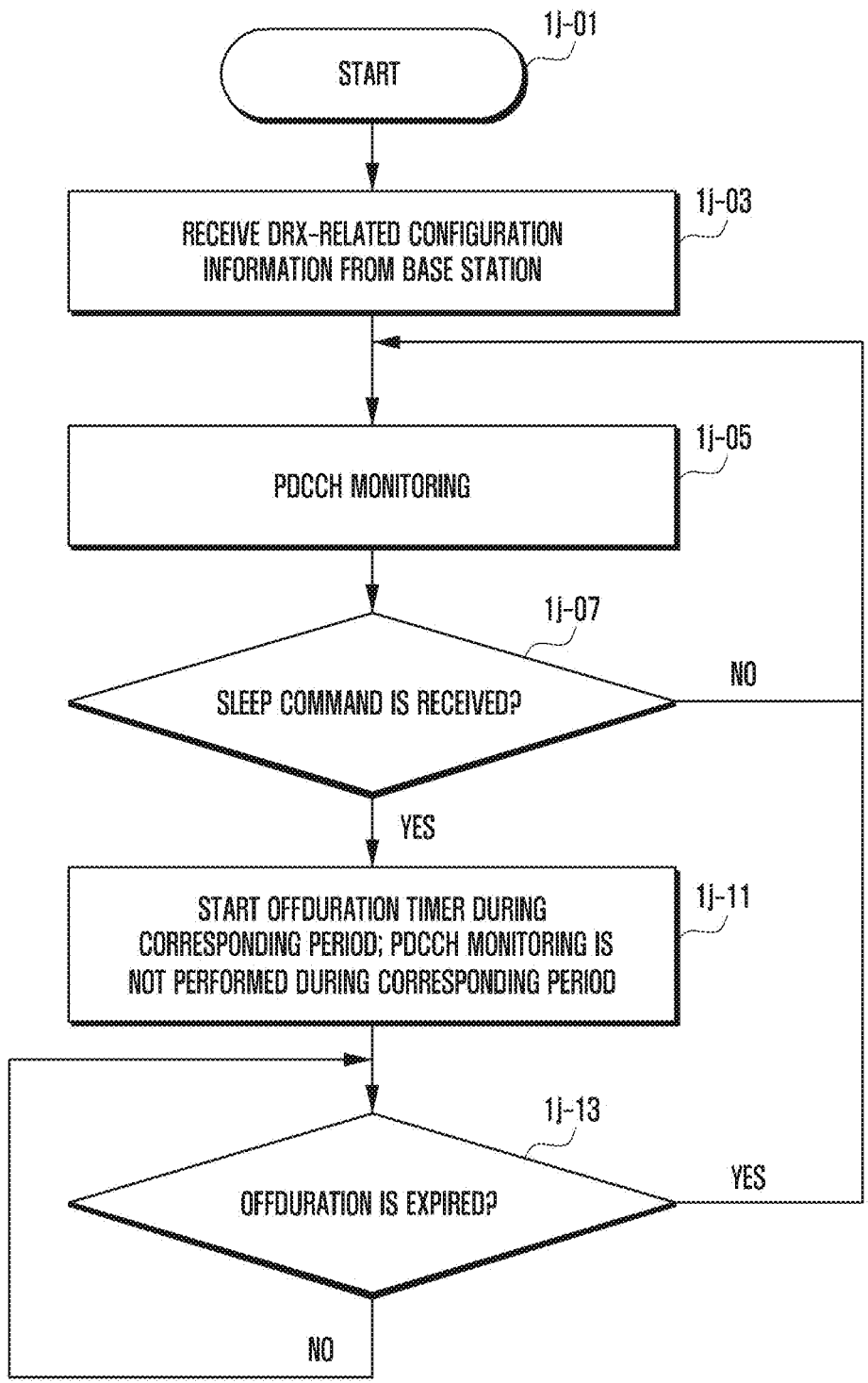
FIG. 1J illustrates the operation order of the UE when the second DRX operation used by the UE operating in the unlicensed band is performed according to an embodiment of the disclosure.

FIG. 1J illustrates an operation order of a UE operating in an unlicensed band when the UE performs a second DRX operation according to an embodiment of the disclosure.

Referring to FIG. 1J, it is assumed that the UE is already successfully connected to the eNB and is in an RRC connected state (RRC_CONNECTED) capable of transmitting and receiving data in operation 1j-01. Thereafter (or when the UE is switched to the connected state), the UE may receive DRX-related configuration information from the eNB in operation 1j-03. The configuration information may include the above-described DRX related parameter, for example, duration of an OffDuration timer. If a DRX operation mode is fundamentally supported, the UE may not receive the configuration information.

Thereafter, in case where the UE monitors a PDCCH to receive data from the eNB and receives control information through the PDCCH, the UE receives or transmits data accordingly in operation 1j-05.

If the UE receives, from the eNB, a message (e.g., a sleep command) (1j-07) indicating that PDCCH monitoring is not required to be performed as in operations 1i-71, 1i-73, 1i-75, and 1i-77 of FIG. 1I, the UE starts an OffDuration timer corresponding to a time included in the message and is not required to monitor the PDCCH during the operation time of the corresponding timer in operation 1j-11.

Thereafter, if the OffDuration timer expires in operation 1j-13, the UE monitors the PDCCH from the eNB and receives control information through the PDCCH, and accordingly receives or transmits data in operation 1j-05.

Through the operation, the UE can discontinuously perform PDCCH monitoring, thereby reducing power consumption of the UE.

Figure 1K:
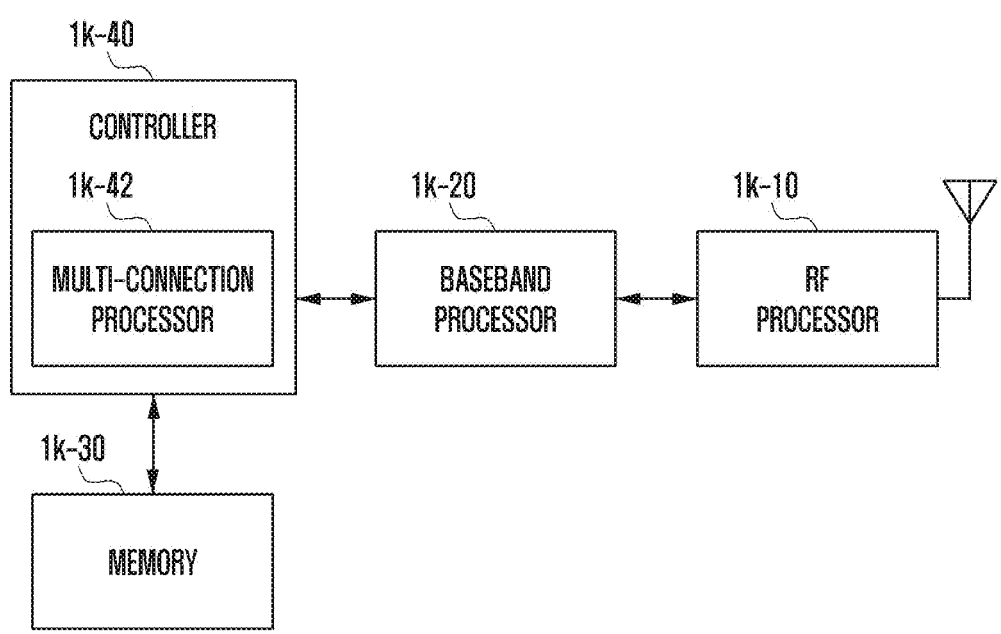
FIG. 1K is a block diagram of the UE in a wireless communication system according to an embodiment of the disclosure.

FIG. 1K is a block diagram of a UE in a wireless communication system according to an embodiment of the disclosure.

Referring to FIG. 1K, the UE includes a radio frequency (RF) processor 1k-10, a baseband processor 1k-20, a memory 1k-30, and a controller 1k-40.

The RF processor 1k-10 performs a function for transmitting and receiving a signal through a wireless channel, such as band conversion and amplification of a signal. That is, the RF processor 1k-10 up-converts a baseband signal provided from the baseband processor 1k-20 into an RF band signal and then transmits the converted signal through an antenna, and down-converts an RF band signal received through the antenna into a baseband signal. For example, the RF processor 1k-10 may include a transmission filter, a reception filter, an amplifier, a mixer, an oscillator, a digital to analog convertor (DAC), and an analog to digital convertor (ADC). Although only one antenna is illustrated in FIG. 1k, the UE may include a plurality of antennas. In addition, the RF processor 1k-10 may include a plurality of RF chains. Moreover, the RF processor 1k-10 may perform beamforming. For the beamforming, the RF processor 1k-10 may control a phase and a size of each signal transmitted/ received through a plurality of antennas or antenna elements.

The baseband processor 1k-20 performs a function for a conversion between a baseband signal and a bitstream according to a physical layer standard of a system. For example, when data is transmitted, the baseband processor 1k-20 generates complex symbols by encoding and modulating a transmission bitstream. In addition, when data is received, the baseband processor 1k-20 reconstructs a received bitstream by demodulating and decoding the baseband signal provided from the RF processor 1k-10. For example, in an orthogonal frequency division multiplexing (OFDM) scheme, when data is transmitted, the baseband processor 1k-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, when data is received, the baseband processor 1k-20 divides the baseband signal provided from the RF processor 1k-10 in the unit of OFDM symbols, reconstructs the signals mapped to the subcarriers through a fast Fourier transform (FFT) operation, and then reconstructs a reception bitstream through demodulation and decoding.

The baseband processor 1k-20 and the RF processor 1k-10 transmit and receive a signal as described above. Accordingly, the baseband processor 1k-20 and the RF processor 1k-10 may be referred to as a transmitter, a receiver, a transceiver, or a communication unit. Furthermore, at least one of the baseband processor 1k-20 and the RF processor 1k-10 may include a plurality of communication modules to support a plurality of different radio access technologies. In addition, at least one of the baseband processor 1k-20 and the RF processor 1k-10 may include different communication modules to process signals of different frequency bands. For example, the different radio access technologies may include a wireless LAN (for example, IEEE 802.11) and a cellular network (for example, LTE). Further, the different frequency bands may include a super high frequency (SHF) (for example, 2.5 GHz and 5 Ghz) band and a millimeter (mm) wave (for example, 60 GHz) band.

The memory 1k-30 stores data such as a basic program, an application program, and configuration information for an operation of the UE. In particular, the memory 1k-30 may store information related to a wireless LAN node performing wireless communication by using a wireless LAN access technology. The memory 1k-30 provides data stored according to a request of the controller 1k-40.

The controller 1k-40 controls overall operations of the UE. For example, the controller 1k-40 transmits and receives a signal through the baseband processor 1k-20 and the RF processor 1k-10. In addition, the controller 1k-40 records data in the memory 1k-30 and reads the data. To this end, the controller 1k-40 may include at least one processor. For example, the controller 1k-40 may include a communication processor (CP) which performs a control for communication, and an application processor (AP) which controls a higher layer such as an application program. According to an embodiment of the disclosure, the controller 1k-40 includes a multi-connection processor 1k-42 which performs a process for operating in a multiple connection mode. For example, the controller 1k-40 may control the UE to perform a procedure of the operation of the UE illustrated in FIG. 1E.

The controller 1k-40 according to an embodiment of the disclosure instructs the UE to determine whether to perform PDCCH monitoring according to a received configuration and message.

Figure 1L:
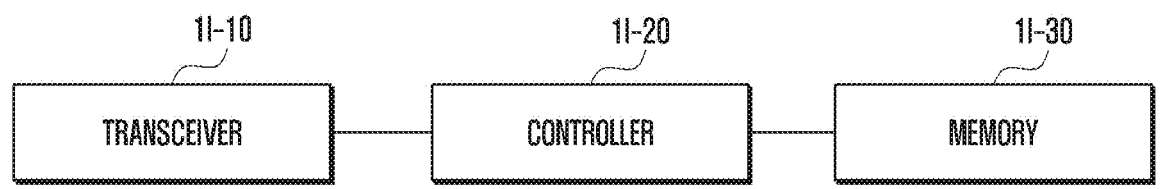
FIG. 1L illustrates a structure of an eNB according to an embodiment of the disclosure.

FIG. 1L illustrates a structure of an eNB according to an embodiment of the disclosure.

Referring to FIG. 1L, an eNB may include a transceiver 1l-10, a controller 1l-20, and a memory 1l-30. In the disclosure, the controller may be defined as a circuit, an application specific integrated circuit, or at least one processor.

The transceiver 1l-10 may transmit and receive a signal to and from other network entities.

The controller 1l-20 may control overall operations of the eNB according to an embodiment proposed in the disclosure. For example, the controller 1l-20 may control a signal flow every between blocks to perform an operation according to the above-described flowchart.

The memory 1l-30 may store at least one piece of information transmitted and received through the transceiver and information generated through the controller.

Methods stated in claims and/or specifications according to various embodiments may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, local area network (LAN), wide LAN (WLAN), and storage area network (SAN) or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

The terms used to identify access nodes, the terms referring to network entities, the terms referring to messages, the terms referring to interfaces between network entities, and the terms referring to various pieces of identification information, which are used in the following description, are exemplified for convenience of description. Therefore, the disclosure may not be limited by the terminologies provided below, and other terms that indicate subjects having equivalent technical meanings may be used.

For convenience of description, the disclosure uses terms and names defined in a 3rd generation partnership project long term evolution (3GPP LTE) standard. However, the disclosure may not be limited by the terms and names, and may be equally applied to systems according to other standards. In the disclosure, an eNB may be used interchangeably with a gNB for convenience of description. That is, an eNB described as an eNB may refer to a gNB.

Figure 2A:
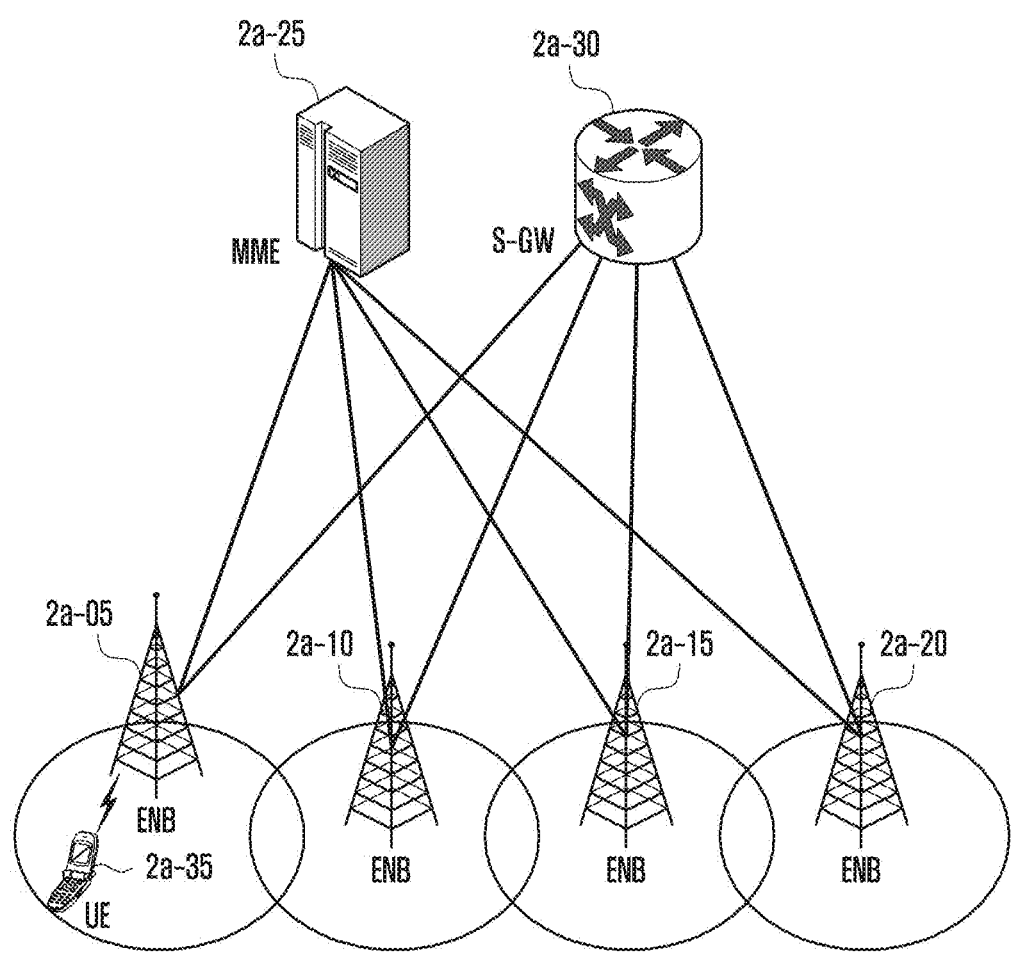
FIG. 2A illustrates a structure of an LTE system according to an embodiment of the disclosure.

FIG. 2A illustrates a structure of an LTE system according to an embodiment of the disclosure.

Referring to FIG. 2A, as shown, a radio access network of an LTE system includes an evolved node B, (hereinafter, eNB, Node B, or base station) 2a-05, 2a-10, 2a-15, and 2a-20 and an MME 2a-25, and an S-GW 2a-30. A UE 2a-35 accesses an external network through the eNBs 2a-05 to 2a-20 and the S-GW 2a-30.

In FIG. 2A, the eNBs 2a-05 to 2a-20 correspond to a conventional Node B of an UMTS system. The eNBs 2a-05 to 2a-20 are connected to the UE 2a-35 through a wireless channel, and perform a more complex function than the conventional Node B. In the LTE system, all user traffic including real-time services such as voice over Internet protocol (VoIP) is serviced through a shared channel, so that there is a need for a device for performing scheduling by collecting status information of UEs, such as buffer states, available transmit power states, and channel states. The eNBs 2a-05 to 2a-20 perform this scheduling function.

A single eNB generally controls a plurality of cells. For example, in order to implement a transmission rate of 100 Mbps, the LTE system uses an Orthogonal Frequency Division Multiplexing (hereinafter, referred to as OFDM) as a wireless access technology in a bandwidth of 20 MHz. Further, an adaptive modulation and coding (hereinafter, referred to as AMC) scheme of determining a modulation scheme and a channel coding rate is applied to the LTE system in correspondence to UE channel states.

The S-GW 2a-30 corresponds to a device for providing a data bearer, and generates or removes the data bearer under a control of the MME 2a-25.

The MME corresponds to a device which is in charge of various control functions including a mobility management function for a UE, and is connected to a plurality of eNBs.

Figure 2B:
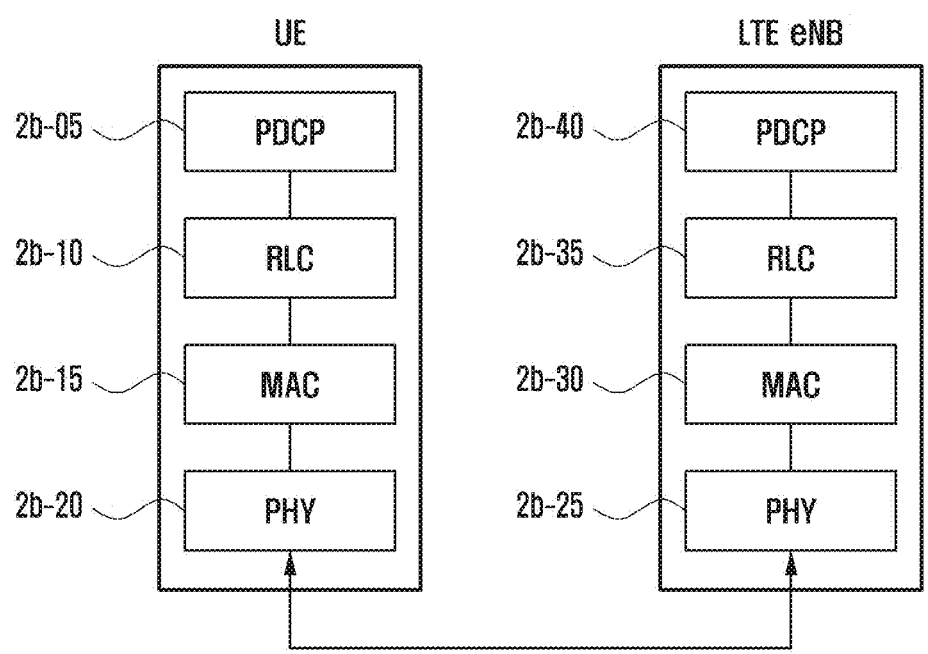
FIG. 2B illustrates a wireless protocol structure in an LTE system according to an embodiment of the disclosure.

FIG. 2B illustrates a wireless protocol structure in an LTE system according to an embodiment of the disclosure.

Referring to FIG. 2B, in relation to a wireless protocol structure of an LTE system, each of a UE and an eNB includes a PDCP layer 2b-05 or 2b-40, an RLC layer 2b-10 or 2b-35, and a MAC layer 2b-15 or 2b-30.

The PDCP layer 2b-05 or 2b-40 is responsible for IP header compression/decompression. The main functions of the PDCP layer are summarized as follows:

Header compression and decompression function (header compression and decompression: ROHC only)
User data transmission function (transfer of user data)
Sequential delivery function (in-sequence delivery of upper layer PDUs at PDCP re-establishment procedure for RLC AM)
Reordering function (For split bearers in DC (only support for RLC AM): PDCP PDU routing for transmission and PDCP PDU reordering for reception)
Duplicate detection function (duplicate detection of lower layer SDUs at PDCP re-establishment procedure for RLC AM)
Retransmission function (retransmission of PDCP SDUs at handover and, for split bearers in DC, of PDCP PDUs at PDCP data-recovery procedure, for RLC AM)
Ciphering and deciphering function (ciphering and deciphering)
Timer-based SDU deletion function (timer-based SDU discard in uplink.)

The radio link control (RLC) layer 2b-10 or 2b-35 reconfigures PDCP packet data units (PDCP PDUs) to a proper size to perform an ARQ operation. The main functions of the RLC layer are summarized as follows:

Data transmission function (transfer of upper layer PDUs)
ARQ function (error correction through ARQ (only for AM data transfer))
Concatenation, segmentation, and reassembly function (concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer)
Duplicate detection function (duplicate detection (only for UM and AM data transfer))
Error detection function (protocol error detection (only for AM data transfer))
RLC SDU deletion function (RLC SDU discard (only for UM and AM data transfer))
RLC re-establishment function (RLC re-establishment)

The MAC 2b-15 or 2b-30 is connected to several RLC-layer devices configured in one UE, and performs an operation of multiplexing RLC PDUs to a MAC PDU and demultiplexing RLC PDUs from a MAC PDU. The main functions of the MAC are summarized as follow:

Mapping function (mapping between logical channels and transport channels)
Multiplexing and demultiplexing function (multiplexing/demultiplexing of MAC SDUs belonging to one or different logical channels into/from transport blocks (TB) delivered to/from the physical layer on transport channels)
Scheduling information report function (scheduling information reporting)
HARQ function (error correction through HARQ)
Logical channel priority control function (priority handling between logical channels of one UE)
UE priority control function (priority handling between UEs by means of dynamic scheduling)
MBMS service identification function (MBMS service identification)
Transmission format selection function (transport format selection)
Padding function (padding)

Physical layers 2b-20 and 2b-25 channel-code and modulate higher layer data into OFDM symbols and transmit the OFDM symbols through a wireless channel, or demodulate and channel-decode OFDM symbols received through the wireless channel to transfer the OFDM symbols to a higher layer.

Figure 2C:
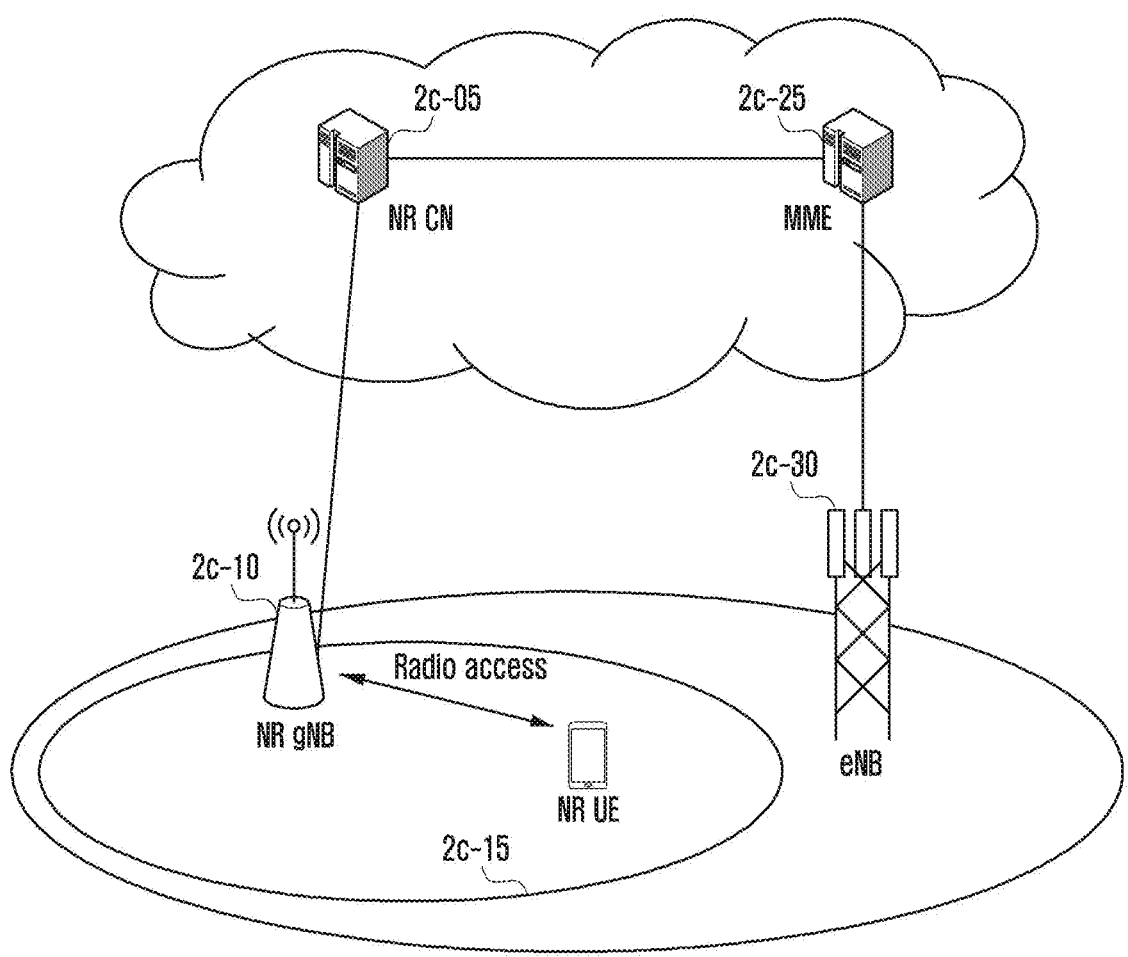
FIG. 2C illustrates a structure of a next-generation mobile communication system according to an embodiment of the disclosure.

FIG. 2C illustrates a structure of a next-generation mobile communication system according to an embodiment of the disclosure.

Referring to FIG. 2C, a radio access network of a next-generation mobile communication system (hereinafter, NR or 5G) includes a new radio node B (hereinafter, referred to as an NR gNB, gNB, or base station) 2c-10 and a new radio core network (NR CN) 2c-05. A user terminal (hereinafter, referred to as a new radio user equipment (NR UE) or a UE) 2a-15 accesses an external network through the NR gNB 2a-10 and the NR CN 2a-05.

In FIG. 2C, the NR gNB 2c-10 corresponds to an evolved Node B (eNB) of a conventional LTE system. The NR gNB may be connected to an NR UE 2c-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, which corresponds to the NR gNB 2c-10.

One NR gNB generally controls a plurality of cells. The NR gNB may have a bandwidth equal to or wider than the conventional maximum bandwidth in order to implement super-high-speed data transmission compared to current LTE and may apply orthogonal frequency division multiplexing (OFDM) through radio access technology and further apply beamforming technology. Further, a modulation scheme and an adaptive modulation and coding (AMC) scheme of determining a channel coding rate are applied in accordance with a channel status of the UE.

The NR CN 2c-05 performs a function of supporting mobility, configuring a bearer, and configuring a QoS. The NR CN is a device for performing a function of managing the mobility of the UE and various control functions, and is connected to a plurality of gNBs. Further, the next-generation mobile communication system may be linked to the conventional LTE system, and the NR CN is connected to an MME 2c-25 through a network interface. The MIME is connected to an eNB 2c-30, which is a conventional base station.

Figure 2D:
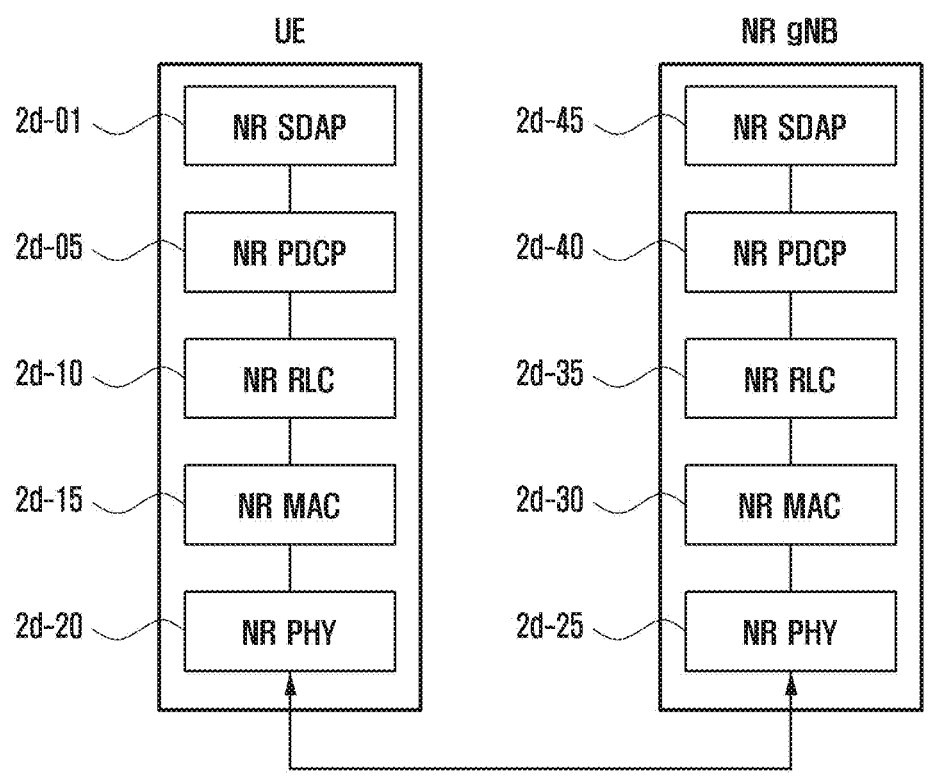
FIG. 2D illustrates a wireless protocol structure of a next-generation mobile communication system according to an embodiment of the disclosure.

FIG. 2D illustrates a wireless protocol structure of a next-generation mobile communication system according to an embodiment of the disclosure.

FIG. 2D further illustrates a wireless protocol structure of a next-generation mobile communication system to which the disclosure can be applied.

Referring to FIG. 2D, the wireless protocol of the next-generation mobile communication system includes NR SDAPs 2d-01 and 2d-45, NR PDCPs 2d-05 and 2d-40, NR RLCs 2d-10 and 2d-35, and NR MACs 2d-15 and 2d-30 in the UE and the NR gNB.

Main functions of the NR SDAPs 2d-01 and 2d-45 may include some of the following functions.
  User data transmission function (transfer of user data)
  Function of mapping QoS flow and a data bearer for uplink and downlink (mapping between a QoS flow and a DRB for both DL and UL)
  Function of making a QoS flow ID for uplink and downlink (marking QoS flow ID in both DL and UL packets)
  Function of mapping reflective QoS flow to a data bearer for uplink SDAP PDUs (reflective QoS flow to DRB mapping for the UL SDAP PDUs)

With respect to the SDAP layer device, the UE may receive a configuration of whether to use a header of the SDAP layer device or a function of the SDAP layer device for each PDCP layer device, each bearer, or each logical channel through an RRC message. If the SDAP header is configured, a 1-bit indicator of NAS reflective QoS and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data processing priority and scheduling information for seamlessly supporting a service.

The main functions of the NR PDCPs 2d-05 and 2d-40 may include some of the following functions.
  Header compression and decompression function (header compression and decompression: ROHC only)
  User data transmission function (transfer of user data)
  Sequential delivery function (in-sequence delivery of upper layer PDUs)
  Non-sequential delivery function (out-of-sequence delivery of upper layer PDUs)
  Reordering function (PDCP PDU reordering for reception)
  Duplicate detection function (duplicate detection of lower layer SDUs)
  Retransmission function (retransmission of PDCP SDUs)
  Ciphering and deciphering function (ciphering and deciphering)
  Timer-based SDU deletion function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the recorded data, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 2d-10 or 2d-35 may include some of the following functions.
  Data transmission function (transfer of upper layer PDUs)
  Sequential delivery function (in-sequence delivery of upper layer PDUs)
  Non-sequential delivery function (out-of-sequence delivery of upper layer PDUs)
  ARQ function (Error correction through ARQ)
  Concatenation, segmentation, and reassembly function (Concatenation, segmentation and reassembly of RLC SDUs)
  Re-segmentation function (re-segmentation of RLC data PDUs)
  Reordering function (reordering of RLC data PDUs)
  Duplicate detection function (duplicate detection)
  Error detection function (protocol error detection)
  RLC SDU deletion function (RLC SDU discard)
  RLC re-establishment function (RLC re-establishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording PDCP PDUs lost due to the reordering, a function of reporting statuses of the lost PDCP PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires even though there is a lost RLC SDU, a function of sequentially transferring all RLC SDUs received before the timer starts to the higher layer, or if a predetermined timer expires even though there is a lost RLC SDU, a function of sequentially transferring all RLC SDUs received up to that point in time to the higher layer. Further, the NR RLC device may process the RLC PDUs sequentially in a reception order thereof (according to an arrival order regardless of a serial number or a sequence number) and may transfer the RLC PDUs to the PDCP device regardless of the sequence thereof (out-of-sequence delivery). In the case of segments, the NR RLC device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 2d-15 and 2d-30 may be connected to a plurality of NR RLC layer devices configured in one UE, and the main functions of the NR MACs may include some of the following functions.
  Mapping function (mapping between logical channels and transport channels)
  Multiplexing and demultiplexing function (multiplexing/demultiplexing of MAC SDUs)
  Scheduling information report function (scheduling information reporting)
  HARQ function (error correction through HARQ)
  Logical channel priority control function (priority handling between logical channels of one UE)
  UE priority control function (priority handling between UEs by means of dynamic scheduling)
  MBMS service identification function (MBMS service identification)
  Transport format selection function (transport format selection)
  Padding function (padding)

The PHY layers 2d-20 and 2d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Figure 2E:
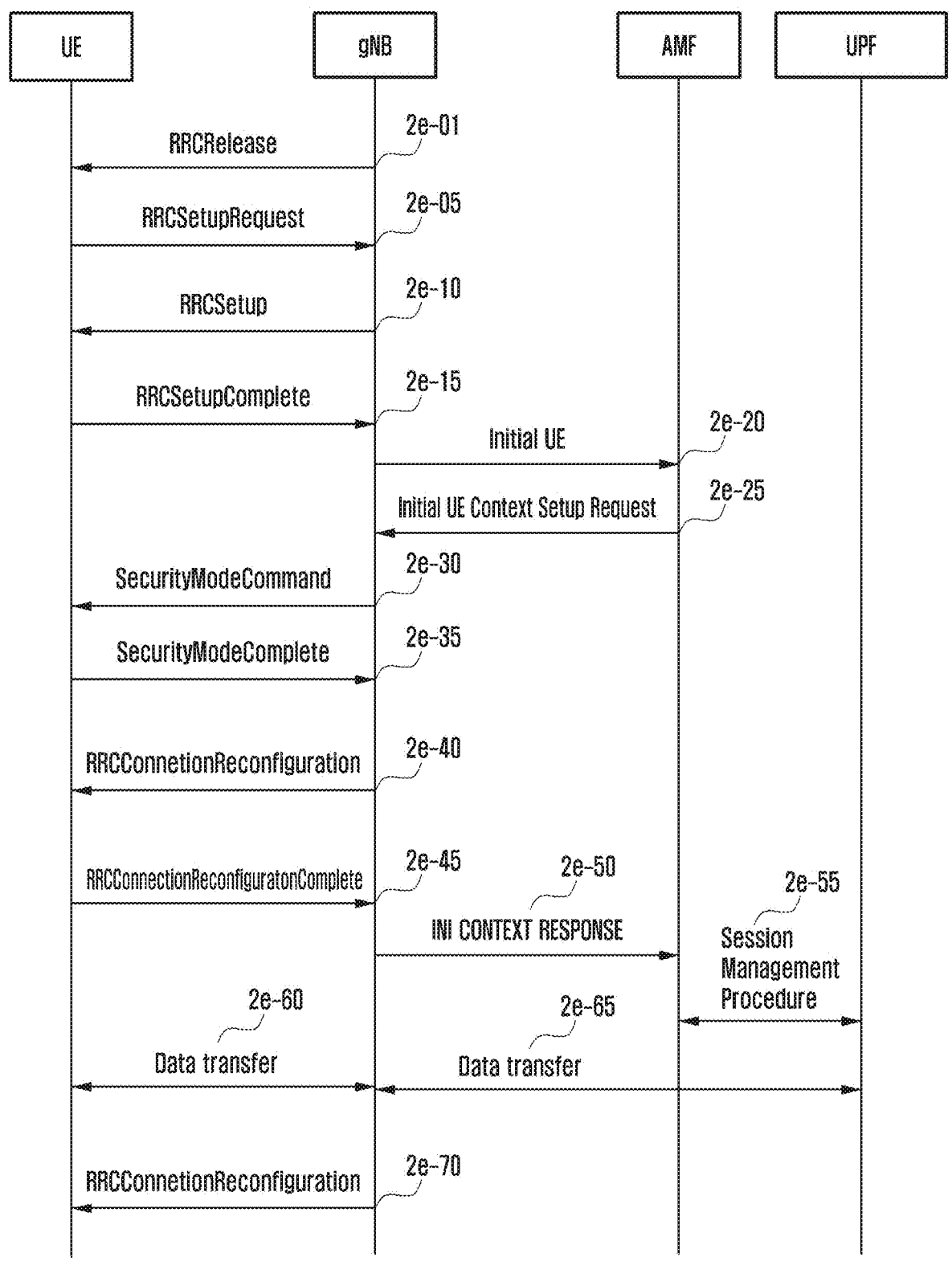
FIG. 2E illustrates a procedure in which a base station releases a connection of a UE and thus the UE switches from an RRC-connected mode to an RRC-idle mode and a procedure in which the UE configures the connection with the base station and thus switches from the RRC-idle mode to the RRC-connected mode according to an embodiment of the disclosure.

FIG. 2E illustrates a procedure in which the gNB releases the connection of the UE and thus the UE switches from an RRC-connected mode to an RRC-idle mode and a procedure in which the UE configures the connection with the gNB and thus switches from the RRC-idle mode to the RRC-connected mode according to an embodiment of the disclosure.

Referring to FIG. 2E, according to an embodiment of the disclosure, if the UE, which transmits and receives data in the RRC-connected mode, has no data transmission and reception for a predetermined purpose or for a predetermined time, the gNB may transmit an RRC connection release message (RRCRelease message) to the UE and thus the UE may switch to the RRC-idle mode in operation 2e-01.

If the UE, which currently has no connection (hereinafter, referred to as an idle-mode UE), has data to be transmitted in the future, the UE may perform an RRC connection establishment process with the gNB.

The UE establishes backward transmission synchronization with the gNB through a random access process and transmits an RRC connection request message (RRCSetupRequest message) to the gNB in operation 2e-05. The RRC connection request message may include an ID of the UE and at least one piece of information on the reason why the UE desires to establish the connection.

The gNB transmits an RRC connection setup message (RRCSetup message) to configure the RRC connection in operation 2e-10. The RRC connection setup message may include RRC connection setup information.

The RRC connection is also referred to as a signaling radio bearer (SRB), and is used for transmitting and receiving an RRC message which is a control message between the UE and the gNB. The UE configuring the RRC connection transmits an RRC connection setup completion message (RRCSetupComplete message) to the gNB in operation 2e-15. The RRC connection setup completion message may include a service request message which the UE transmits to an AMF to configure a bearer for a predetermined service.

The gNB may transmit an initial UE message including the service request message included in the RRC connection setup completion message to the AMF in operation 2e-20, and the AMF may determine whether to provide the service requested by the UE.

If it is determined to provide the service requested by the UE on the basis of the determination result, the AMF transmits an initial UE context setup request message to the gNB in operation 2e-25. The initial UE context setup request message may include at least one piece of quality of service (QoS) information to be applied when a data radio bearer (DRB) is configured and security-related information to be applied to the DRB (for example, a security key and a security algorithm).

The gNB may transmit a security mode command message (SecurityModeCommand message) to the UE in order to set security in operation 2e-30 and receive a security mode completion message (SecurityModeComplete message) in operation 2e-35.

If the security is completely set, the gNB transmits an RRC connection reconfiguration message (RRCReconfiguration message) to the UE in operation 2e-40. The RRC connection reconfiguration message includes configuration information of a DRB to process user data, and the UE applies the information to configure the DRB and transmits an RRC connection reconfiguration completion message (RRCReconfigurationComplete message) to the gNB in operation 2e-45.

The gNB having completely configured the DRB with the UE transmits an initial UE context setup request response message (initial UE context setup response message) to the AMF in operation 2e-50, and the AMF receiving the message establishes a PDU session through a session management procedure with a UPF in operation 2e-55. If the above process is completed, the UE transmits and receives data to and from the gNB through the UPF in operations 2e-60 and 2e-65. As described above, the general data transmission process largely consists of three operations such as RRC connection setup, security setup, and DRB setup. Further, the gNB may transmit an RRCReconfiguration message in order to provide a new configuration to the UE or add or change the configuration for a predetermined reason in operation 2e-70.

As described above, the UE needs many signaling procedures to configure the RRC connection and switch from the RRC-idle mode to the RRC-connected mode. Accordingly, the next-generation mobile communication system may newly define the RRC-inactive mode, and the UE and the gNB may store UE context in such a new mode and maintain an S1 bearer if necessary, and thus if the RRC-inactive mode UE accesses the network again, the UE may more rapidly access the network through a smaller signaling procedure due to an RRC reconnection configuration procedure described below and transmit and receive data.

Figure 2F:
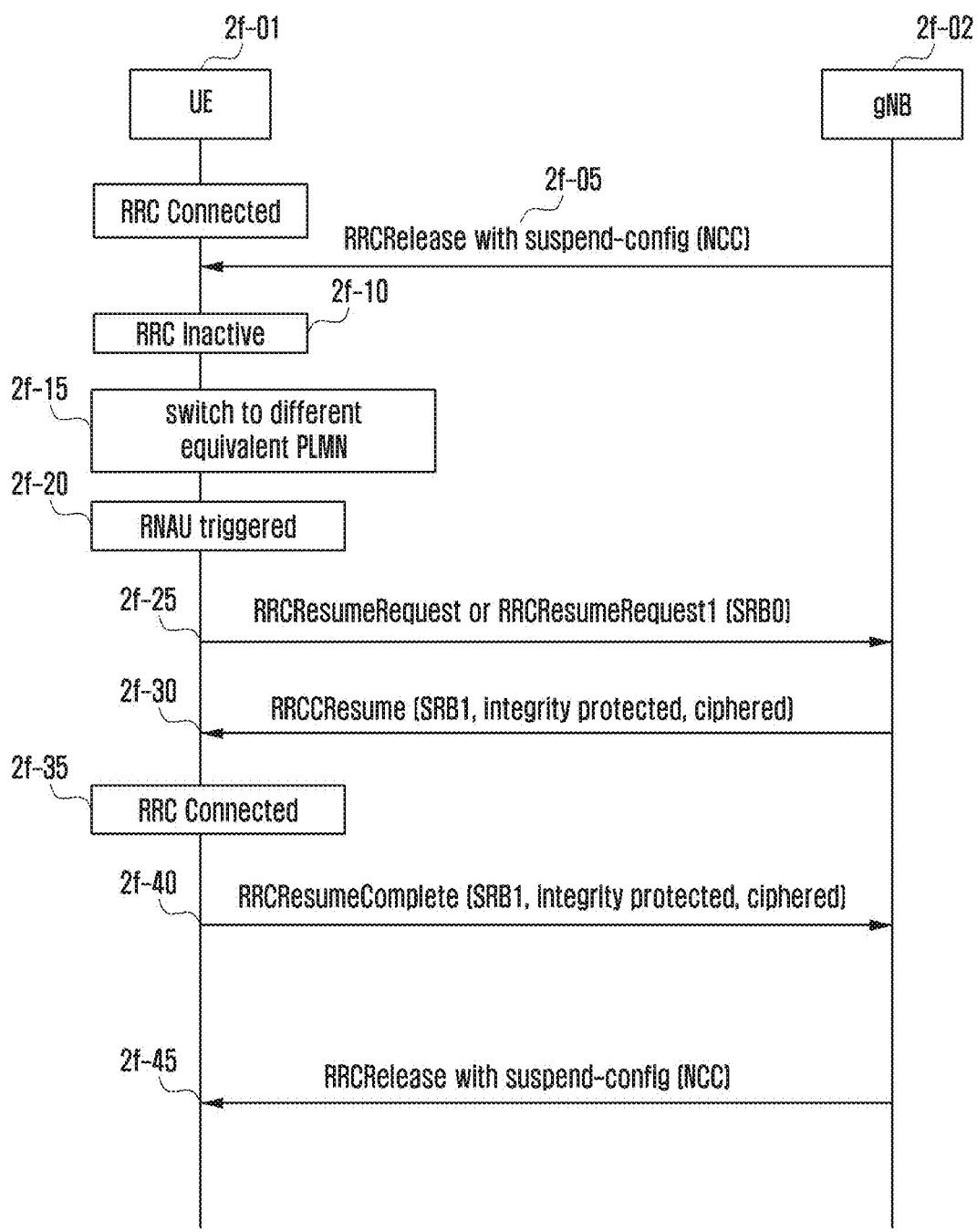
FIG. 2F illustrates a procedure in which the base station releases the connection of the UE and thus the UE switches from an RRC-connected mode to an RRC-inactive mode and a procedure in which the UE configures the connection with the base station and thus switches from the RRC-inactive mode to the RRC-connected mode according to an embodiment of the disclosure.

FIG. 2F illustrates a procedure in which the gNB releases the connection of the UE and thus the UE switches from an RRC-connected mode to an RRC-inactive mode and a procedure in which the UE configures the connection with the gNB and thus switches from the RRC-inactive mode to the RRC-connected mode according to an embodiment of the disclosure.

Referring to FIG. 2F, a UE 2f-01 may make a network connection with a gNB 2f-02 and transmit and receive data. If the gNB should transition the UE to an RRC-inactive mode for a predetermined reason, the gNB may transmit an RRC connection release message (RRCRelease message) including suspend configuration information (suspendConfig) in operation 2f-05 so as to transition the UE to the RRC-inactive mode.

UE operation proposed when the UE receives the RRCRelease message including the suspend configuration information in operation 2f-05 is described below. The UE may perform some or all of the following operations or may skip some operations.

If the RRCRelease message includes suspend configuration information (suspendConfig), the UE may apply the received suspend configuration information.

If there is no RAN notification area information (RAN-NotificationAreaInfo) in the suspend configuration information, the UE may apply a RAN notification area information that the UE stores in advance. This is to support a delta configuration for the UE because the size of the RAN notification area information is big.

If there is RAN notification area information in the suspend configuration information, the UE may update the stored values to be new RAN notification area information included in the suspend configuration information of the RRCRelease message.

If there is no timer value (for example, t380) in the suspend configuration information, the UE may release t380 that has been already stored.

If there is t380 in the suspend configuration information, the UE may store t380 included in the suspend configuration information of the RRCRelease message.

The UE may store at least one piece of information such as a full UE connection resume identifier (Full-RNTI), a partitioned UE connection resume identifier (Shord-RNTI), NCC (nextHopChainingCount), and a RAN paging cycle (RAN-PagingCycle) included in the suspend configuration information.

Further, the UE may reset the MAC layer device. This is to prevent unnecessary retransmission when the connection of data stored in the HARQ buffer resumes.

The UE may re-establish the RLC layer devices for all SRBs and DRBs. This is to prevent unnecessary retransmission when the connection of data stored in the RLC buffer resumes and to initialize parameters to be used in the future.

Unless the UE receives the RRCRelease message including the suspend configuration information in response to an RRC connection resume request message (RRCResumeRequest message), the UE may store UE context. The UE context may include at least one of current RRC configuration information, current security context information, PDCP status information including ROHC status information, SDAP configuration information, a UE cell identifier (C-RNTI) used in a source cell (source PCell), a cell identity of a source cell (CellIdentity), and a physical cell identity.

The UE may suspend all SRBs and DRBs except for SRB0.

The UE may start the timer t380 with a period LAN notification area update timer value (PeriodicRNAU-TimerValue) included in the suspend configuration information.

The UE may report suspension of the RRC connection to a higher layer.

The UE configures lower layer devices to stop an integrity protection and encryption function.

Further, the UE may transition to the RRC-inactive mode.

As described above, the UE transitioning to the RRC-inactive mode in operation 2*f*-10 may reselect or switch/transition from a current equivalent public land mobile network (PLMN) or a registered PLMN to another equivalent PLMN during movement I operation 2*f*-15. If the UE reselects or transitions to another equivalent PLMN, the proposed UE operation is as described below.

If the gNB supports sharing of networks (sharing of a plurality of equivalent PLMNs), higher layer devices (upper layers) or the NAS layer of the UE may inform the RRC layer or the AS layer (or lower layer) of the UE of reselection of or switching to another equivalent PLMN. In addition, the higher layer devices or the NAS layer of the UE may inform the RRC layer or the AS layer of the UE of the reason of connection resume through mo-signaling. The RRC layer or the AS layer of the UE may store the selected PLMN-identify provided by the higher layers or the NAS layer of the UE. For example, the UE may store the selected PLMN-identity in an internal state variable. In addition, the RRC layer or the AS layer of the UE may store mo-signaling.

If the RRC-inactive UE is located in a RAN-based notification area (RNA) that is not included in LAN notification area information configured in the UE after the timer t380 expires or after a cell reselection process in the above-described procedure, a RAN-based notification area update (RNAU) procedure may be triggered in operation 2*f*-20.

If the higher layer or the RRC layer of the UE makes a request for resuming the RRC connection, the RRC-inactive mode UE may perform a random access procedure and transmit an RRC message to the gNB in operation 2*f*-25, and the UE operation proposed therefor is described below.

Specifically, the UE may perform at least one of the following operations in connection with transmission of an RRCResume Request message or an RRCResumeRequest1 message. Alternatively, the following operations may be omitted.

If a useFullResumeID field is signaled through system information (SIB1), the UE may select RRCResumeRequest1 as a message to be transmitted to the gNB. The UE may configure resumeIdentity as a full UE connection resume identifier value (fullI-RNTI value). The fullI-RNTI value may be stored in the UE. The UE may transmit the RRCResumeRequest1 message including the resumeIdentity.

Otherwise, the UE may select an RRCResumeRequest as a message to be transmitted to the gNB. The UE may configure shortResumeIdentity as a partitioned UE connection resume identifier value (shortI-RNTI value). The UE may transmit an RRCResumeRequest message including shortResumeIdentity.

The UE may select mo-Signaling as a reason to resume the connection (resumeCause).

If higher layer devices or the NAS layer of the UE provide a PLMN, the PLMN selected by the higher layer device or the NAS layer of the UE may be configured as selectedPLMN-Identity on the basis of a PLMN-IdentityList included in SIB1. Accordingly, the UE may transmit an RRCResumeRequest message or an RRCResumeRequest1 message including the selectedPLMN-Identity. In the disclosure, the RRCResumeRequest message may also be referred to as a first RRCResumeRequest message, and the RRCResumeRequest1 message may also be referred to as a second RRCResumeRequest message.

The UE may calculate MAC-I and insert the MAC-I into the selected message.

The UE may reconstruct RRC configuration information and security context information on the basis of UE context except for cell group configuration information (cellGroupConfig). The UE context may be stored in the UE.

The UE updates a new KgNB security key on the basis of a current KgNB security key, an NH (NextHop) value, and an NCC value. The NCC value may be stored in the UE.

The UE may induce new security keys (K_RRCenc, K_RRC_int, K_UPint, and K_UPenc) to be used in an integrity protection and verification procedure and an encryption and decryption procedure using the newly updated KgNB security key.

The UE may resume the integrity protection and verification procedure by applying the updated security keys and a previously configured algorithm to all bearers except for SRB0 and then apply integrity verification and protection to transmitted and received data. This is to increase reliability and security of data transmitted and received from SRB1 or DRBs.

The UE may resume an encryption and decryption procedure by applying the updated security keys and a previously configured algorithm to all bearers except for SRB0 and then apply encryption and decryption to transmitted and received data. This is to increase reliability and security of data transmitted and received from SRB1 or DRBs.

The UE may reconstruct a PDCP status and reestablish PDCP entities for SRB1.

Further, the UE resumes SRB1. This is because an RRCResume message is received through SRB1 in response to an RRCResumeRequest message or an RRCResumeRequest1 message to be transmitted.

Thereafter, the higher layer of the UE may transmit the selected message to be transmitted to the gNB, that is, the RRCResumeRequest message or the RRCResumeRequest1 message to lower layer devices.

Accordingly, the UE may transmit the RRCResumeRequest message or the RRCResumeRequest1 message to the gNB. Further, the UE may transmit the RRCResumeRequest message or the RRCResumeRequest1 message and start a timer T319.

If the RNAU procedure is triggered, the UE may perform a random access procedure to perform the RNAU procedure and transmit the RRCResumeRequest message or the RRCResumeRequest1 message to the gNB in operation 2*f*-25, and may receive an RRC connection resume message (RRCResume message) in response thereto in operation 2*f*-30. The UE operation proposed in such a case is described below in operation 2*f*-30. The UE may perform at least one of the following operations or the following operations may be omitted.

If the UE receives the RRCResume message, the UE stops the driven timer T319 according to transmission of the RRCResumeRequest message or the RRCResumeRequest1 message.

If full configuration information (fullConfig) is included in the RRCResume message, the UE performs a full configuration procedure. Otherwise, if the UE receives the RRCResume message, the UE may reconstruct the PDCP status and reset a COUNT value for SRB2 and all DRBs. The UE may reconstruct cell group configuration information (cellGroupConfig) on the basis of stored UE context. The UE indicates this to lower layer devices.

The UE may release the full UE connection resume identifier (FullI-RNTI), the partitioned UE connection resume identifier (Shord-RNTI), and the stored UE context. At this time, the UE does not release RAN notification area information (RAN-NotificationAreaInfo).

If master cell group (masterCellgroup) configuration information is included in the RRCResume message, the UE may perform a cell group configuration procedure according to configuration information.

If bearer configuration information (radioBearerConfig) is included in the RRCResume message, the UE may configure a bearer according to configuration information.

The UE may resume SRB2 and all DRBs.

If the UE stores cell reselection priority information, the UE may discard the information. The information may be cell reselection priority information, stored on the basis of CellReselectionPriorities that may be included in the RRCRelease message or received from another RAT.

If the timer T320 is being driven, the UE may stop it.

If frequency measurement configuration information (measConfig) is included in the RRCResume message, the UE may measure a frequency according to configuration information.

If the RRC connection is suspended, the UE may resume frequency measurement.

The UE transitions to the RRC-connected mode in operation 2*f*-35. Accordingly, the UE indicates to higher layer devices that the RRC connection, which had been suspended, is resumed. The UE may stop the cell reselection procedure. The UE may consider a currently accessed cell as a primary cell (PCell).

The UE transitioning to the RRC-connected mode may transmit an RRC connection resume completion message (RRCResumeComplete message) in operation 2*f*-40. Specifically, the UE may configure the RRCResumeComplete message as follows.

If higher layer devices provide a NAS PDU, the UE may insert the NAS PDU into a dedicatedNAS-Message.

If higher layer devices or the NAS layer provide a PLMN, the PLMN selected by the higher layer devices or the NAS layer may be configured as a selectedPLMN-Identity on the basis of a PLMN-IdentityList included in SIB 1.

The gNB receiving the RRCResumeComplete message may transmit an RRCRelease message including suspend configuration information to the UE in operation 2*f*-45. Alternatively, if the gNB does not transmit the RRCRelease message including the suspend configuration information to the UE in operation 2*f*-45, the UE may transmit and receive data to and from the gNB. Alternatively, the gNB may transmit another RRC message (for example, an RRCReject message or an RRCRelease message including no suspend configuration information) to the UE in operation 2*f*-45.

Figure 2G:
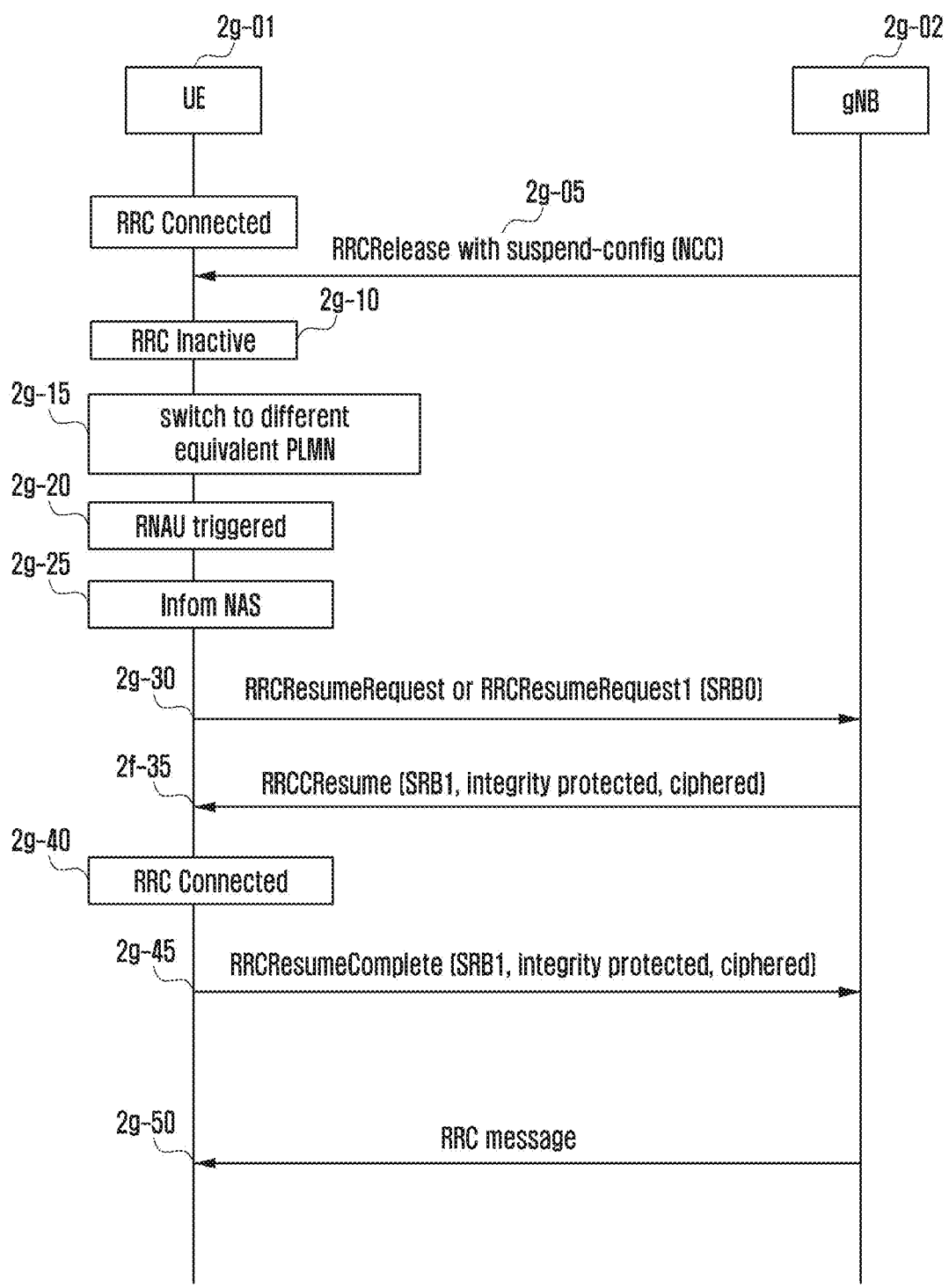
FIG. 2G illustrates a procedure in which the base station releases the connection of the UE and thus the UE switches from an RRC-connected mode to an RRC-inactive mode and a procedure in which the UE configures the connection with the base station and thus switches from the RRC-inactive mode to the RRC-connected mode according to an embodiment of the disclosure.

FIG. 2G illustrates a procedure in which the gNB releases the connection of the UE and thus the UE switches from an RRC-connected mode to an RRC-inactive mode and a procedure in which the UE configures the connection with the gNB and thus switches from the RRC-inactive mode to the RRC-connected mode according to an embodiment of the disclosure.

Referring to FIG. 2G, a UE 2*g*-01 may make a network connection with a gNB 2*g*-02 and transmit and receive data. If the gNB should transition the UE to an RRC-inactive mode for a predetermined reason, the gNB may transmit an RRC connection release message (RRCRelease message) including suspend configuration information (suspendConfig) in operation 2*g*-05 so as to transition the UE to the RRC-inactive mode.

The UE operation proposed when the UE receives the RRCRelease message including the suspend configuration information in operation 2*f*-05 is described below. The UE may perform some or all of the following operations or may skip some operations.

If the RRCRelease message includes suspend configuration information (suspendConfig), the UE may apply the received suspend configuration information.

If there is no RAN notification area information (RAN-NotificationAreaInfo) in the suspend configuration information, the UE may apply a RAN notification area information that the UE stores in advance. This is to support a delta configuration for the UE because the size of the RAN notification area information is big.

If there is RAN notification area information in the suspend configuration information, the UE may update the stored values to be new RAN notification area information included in the suspend configuration information of the RRCRelease message.

If there is no timer value (for example, t380) in the suspend configuration information, the UE may release t380 that has been already stored.

If there is t380 in the suspend configuration information, the UE may store t380 included in the suspend configuration information of the RRCRelease message.

The UE may store at least one piece of information such as a full UE connection resume identifier (Full-RNTI), a partitioned UE connection resume identifier (Shord-RNTI), NCC (nextHopChainingCount), and a RAN paging cycle (RAN-PagingCycle) included in the suspend configuration information.

Further, the UE may reset the MAC layer device. This is to prevent unnecessary retransmission when the connection of data stored in the HARQ buffer resumes.

The UE may re-establish the RLC layer devices for all SRBs and DRBs. This is to prevent unnecessary retransmission when the connection of data stored in the RLC buffer resumes and initializes parameters to be used in the future.

Unless the UE receives the RRCRelease message including the suspend configuration information in response to an RRC connection resume request message (RRCResumeRequest message), the UE may store UE context. The UE context may include at least one of current RRC configuration information, current security context information, PDCP status information including ROHC status information, SDAP configuration information, a UE cell identifier (C-RNTI) used in a source cell (source PCell), a cell identity of a source cell (CellIdentity), and a physical cell identity.

The UE may suspend all SRBs and DRBs except for SRB0.

The UE may start the timer t380 with a period LAN notification area update timer value included in the suspend configuration information.

The UE may report suspension of the RRC connection to a higher layer.

The UE configures lower layer devices to stop an integrity protection and encryption function.

Further, the UE may transition to the RRC-inactive mode.

As described above, the UE transitioning to the RRC-inactive mode in operation 2g-10 may reselect or switch/transition from a current equivalent PLMN or a registered PLMN to another equivalent PLMN during movement in operation 2g-15.

If the RRC-inactive UE is located in a RAN-based notification area (RNA) that is not included in LAN notification area information configured in the UE after the timer t380 expires or after a cell reselection process, a RAN-based notification area update (RNAU) procedure may be triggered in operation 2g-20.

Accordingly, a lower layer of the UE may inform the NAS layer or higher layer devices of the UE that the RAN-based notification area update procedure is performed in operation 2g-25. At this time, if the NAS layer or higher layer devices reselect or transition to another equivalent PLMN, the UE may generate a NAS PDU and transmit the NAS PDU to the AS layer device.

The RRC-inactive mode UE may perform a random access procedure and transmit an RRC message to the gNB, and the UE operation proposed therefor is described below in operation 2g-30. The UE may perform at least one of the following operations in connection with transmission of an RRCResume Request message or an RRCResumeRequest1 message. Alternatively, the following operation may be omitted.

If a useFullResumeID field is signaled through system information (SIB1), the UE may select RRCResumeRequest1 as a message to be transmitted to the gNB. The UE may configure resumeIdentity as a full UE connection resume identifier value (fullI-RNTI value). The fullI-RNTI value may be stored in the UE. The UE may transmit the RRCResumeRequest1 message including the resumeIdentity.

Otherwise, the UE may select an RRCResumeRequest as a message to be transmitted to the gNB. The UE may configure shortResumeIdentity as a partitioned UE connection resume identifier value (shortI-RNTI value). The shortI-RNTI value may be stored in the UE. The UE may transmit an RRCResumeRequest message including shortResumeIdentity.

The UE may select mo-Signalling as a reason to resume the connection (resumeCause).

If higher layer devices or the NAS layer of the UE provide a PLMN, the PLMN selected by the higher layer device or the NAS layer of the UE may be configured as selectedPLMN-Identity on the basis of a PLMN-IdentityList included in SIB1. Accordingly, the UE may transmit an RRCResumeRequest message or an RRCResumeRequest1 message including the selectedPLMN-Identity.

The UE may calculate MAC-I and insert the MAC-I into the selected message.

The UE may reconstruct RRC configuration information and security context information on the basis of UE context except for cell group configuration information (cellGroupConfig). The UE context may be stored in the UE.

The UE updates a new KgNB security key on the basis of a current KgNB security key, an NH (NextHop) value, and an NCC value. The NCC value may be stored in the UE.

The UE may induce new security keys (K_RRCenc, K_RRC_int, K_UPint, and K_UPenc) to be used in an integrity protection and verification procedure and an encryption and decryption procedure using the newly updated KgNB security key.

The UE may resume the integrity protection and verification procedure by applying the updated security keys and a previously configured algorithm to all bearers except for SRB0 and then apply integrity verification and protection to transmitted and received data. This is to increase reliability and security of data transmitted and received from SRB1 or DRBs.

The UE may resume an encryption and decryption procedure by applying the updated security keys and a previously configured algorithm to all bearers except for SRB0 and then apply encryption and decryption to transmitted and received data. This is to increase reliability and security of data transmitted and received from SRB1 or DRBs.

The UE may reconstruct a PDCP status and reestablish PDCP entities for SRB1.

Further, the UE resumes SRB1. This is because an RRCResume message is received through SRB1 in response to an RRCResumeRequest message or an RRCResumeRequest1 message to be transmitted.

Thereafter, the higher layer of the UE may transmit the selected message to be transmitted to the gNB, that is, the RRCResumeRequest message or the RRCResumeRequest message to lower layer devices.

Accordingly, the UE may transmit the RRCResumeRequest message or the RRCResumeRequest message to the gNB. Further, the UE may transmit the RRCResumeRequest message or the RRCResumeRequest message and start a timer T319.

If the RNAU procedure is triggered, the UE may perform a random access procedure to perform the RNAU procedure and transmit the RRCResumeRequest message or the RRCResumeRequest1 message to the gNB in operation 2g-30, and may receive an RRC connection resume message (RRCResume message) in response thereto in operation 2g-35. The UE operation proposed in such a case is described below in operation 2g-35. The UE may perform at least one of the following operations or the following operations may be omitted.

If the UE receives the RRCResume message, the driven timer T319 stops according to transmission of the RRCResumeRequest message or the RRCResumeRequest1 message.

If full configuration information (fullConfig) is included in the RRCResume message, the UE performs a full configuration procedure. Otherwise, if the UE receives the RRCResume message, the UE may reconstruct the PDCP status and reset a COUNT value for SRB2 and all DRBs. The UE may reconstruct cell group configuration information (cellGroupConfig) on the basis of stored UE context. The UE indicates this to lower layer devices.

The UE may release the full UE connection resume identifier (FullI-RNTI), the partitioned UE connection resume identifier (Shord-RNTI), and the stored UE context. At this time, the UE does not release RAN notification area information (RAN-NotificationAreaInfo).

If master cell group (masterCellgroup) configuration information is included in the RRCResume message, the UE may perform a cell group configuration procedure according to configuration information.

If bearer configuration information (radioBearerConfig) is included in the RRCResume message, the UE may configure a bearer according to configuration information.

The UE may resume SRB2 and all DRBs.

If the UE stores cell reselection priority information, the UE may discard the information. The information may be cell reselection priority information, stored on the basis of CellReselectionPriorities that may be included in the RRCRelease message or received from another RAT.

If the timer T320 is being driven, the UE may stop it.

If frequency measurement configuration information (measConfig) is included in the RRCResume message, the UE may measure a frequency according to configuration information.

If the RRC connection is suspended, the UE may resume frequency measurement.

The UE transitions to the RRC-connected mode in operation 2g-40. Accordingly, the UE indicates to higher layer devices that the RRC connection, which had been suspended, is resumed. The UE may stop the cell reselection procedure. The UE may consider a currently accessed cell as a primary cell (PCell).

The UE transitioning to the RRC-connected mode may transmit an RRC connection resume completion message (RRCResumeComplete message) in operation 2f-45. Specifically, the UE configures the RRCResumeComplete message as follows and transmits the RRCResumeComplete message in operation 2g-45.

If higher layer devices provide a NAS PDU, the UE may insert the NAS PDU into a dedicatedNAS-Message.

If higher layer devices or the NAS layer provide a PLMN, the PLMN selected by the higher layer devices or the NAS layer may be configured as a selectedPLMN-Identity on the basis of a PLMN-IdentityList included in SIB 1.

The gNB receiving the RRCResumeComplete message may transmit an RRCRelease message including suspend configuration information to the UE in operation 2g-50. Alternatively, if the UE does not receive the RRCRelease message including the suspend configuration information from the gNB in operation 2g-50, the UE may transmit and receive data to and from the gNB. Alternatively, the gNB may transmit another RRC message (for example, an RRCReject message or an RRCRelease message including no suspend configuration information) to the UE in operation 2g-50.

Figure 2H:
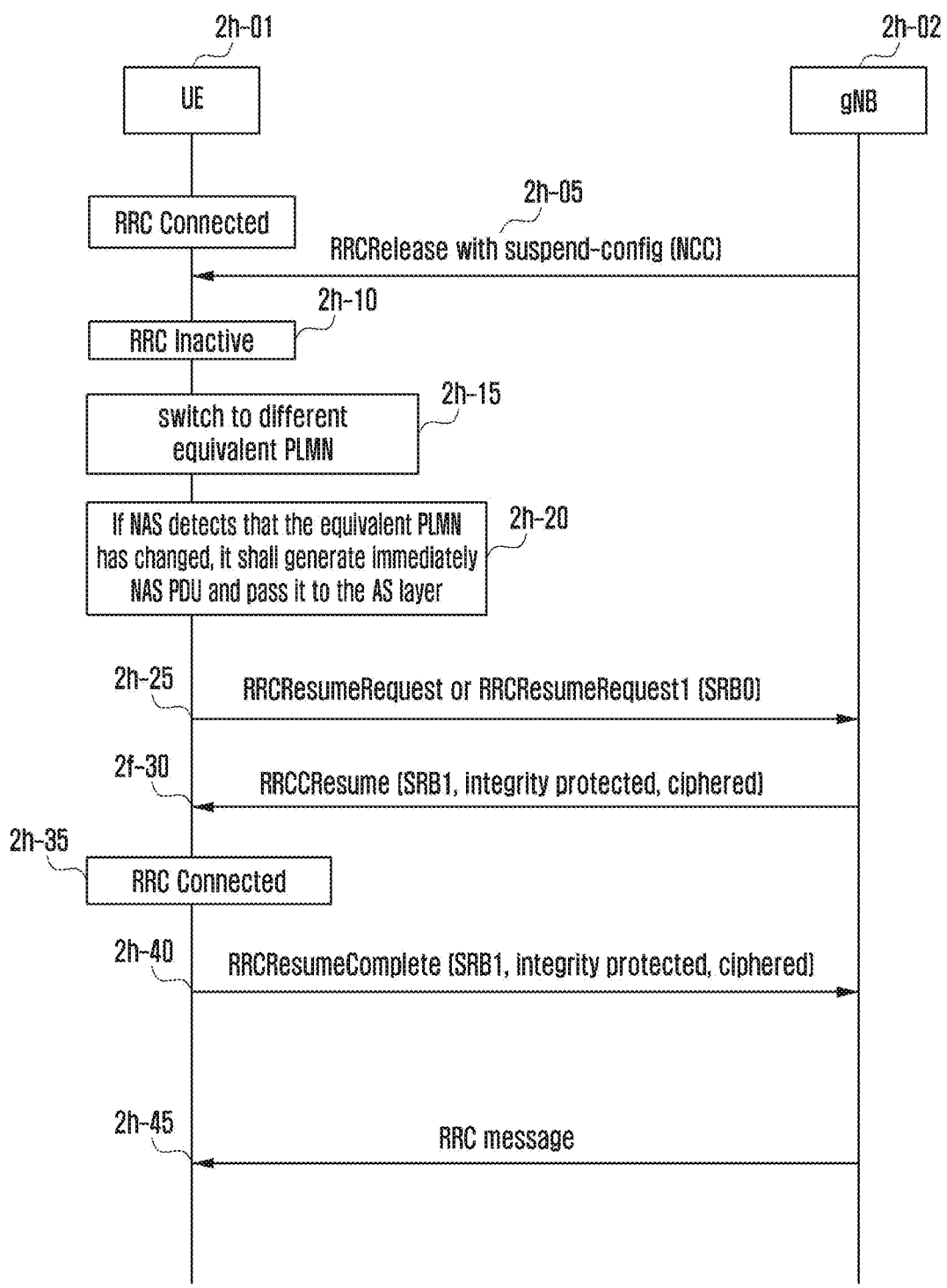
FIG. 2H illustrates a procedure in which the base station releases the connection of the UE and thus the UE switches from an RRC-connected mode to an RRC-inactive mode and a procedure in which the UE configures the connection with the base station and thus switches from the RRC-inactive mode to the RRC-connected mode according to an embodiment of the disclosure.

FIG. 2H illustrates a procedure in which the gNB releases the connection of the UE and thus the UE switches from an RRC-connected mode to an RRC-inactive mode and a procedure in which the UE configures the connection with the gNB and thus switches from the RRC-inactive mode to the RRC-connected mode according to an embodiment of the disclosure.

Referring to FIG. 2H, a UE 2h-01 may make a network connection with a gNB 2h-02 and transmit and receive data. If the gNB should transition the UE to an RRC-inactive mode for a predetermined reason, the gNB may transmit an RRC connection release message (RRCRelease message) including suspend configuration information (suspendConfig) in operation 2h-05 so as to transition the UE to the RRC-inactive mode.

UE operation proposed when the UE receives the RRCRelease message including the suspend configuration information in operation 2h-05 is described below. The UE may perform some or all of the following operations or may skip some operations.

If the RRCRelease message includes suspend configuration information (suspendConfig), the UE may apply the received suspend configuration information.

If there is no RAN notification area information (RAN-NotificationAreaInfo) in the suspend configuration information, the UE may apply a RAN notification area information that the UE stores in advance. This is to support a delta configuration for the UE because the size of the RAN notification area information is big.

If there is RAN notification area information in the suspend configuration information, the UE may update the stored values to be new RAN notification area information included in the suspend configuration information of the RRCRelease message.

If there is no timer value (for example, t380) in the suspend configuration information, the UE may release t380 that has been already stored.

If there is t380 in the suspend configuration information, the UE may store t380 included in the suspend configuration information of the RRCRelease message.

The UE may store at least one piece of information such as a full UE connection resume identifier (Full-RNTI), a partitioned UE connection resume identifier (Shord-RNTI), NCC (nextHopChainingCount), and a RAN paging cycle (RAN-PagingCycle) included in the suspend configuration information.

Further, the UE may reset the MAC layer device. This is to prevent unnecessary retransmission when the connection of data stored in the HARQ buffer resumes.

The UE may re-establish the RLC layer devices for all SRBs and DRBs. This is to prevent unnecessary retransmission when the connection of data stored in the RLC buffer resumes and to initialize parameters to be used in the future.

Unless the UE receives the RRCRelease message including the suspend configuration information in response to an RRC connection resume request message (RRCResumeRequest message), the UE may store UE context. The UE context may include at least one of current RRC configuration information, current security context information, PDCP status information including ROHC status information, SDAP configuration information, a UE cell identifier (C-RNTI) used in a source cell (source PCell), a cell identity of a source cell (CellIdentity), and a physical cell identity.

The UE may suspend all SRBs and DRBs except for SRB0.

The UE may start the timer t380 with a period LAN notification area update timer value included in the suspend configuration information.

The UE may report suspension of the RRC connection to a higher layer.

The UE configures lower layer devices to stop an integrity protection and encryption function.

Further, the UE may transition to the RRC-inactive mode.

As described above, the UE transitioning to the RRC-inactive mode (in operation 2h-10) may reselect or switch/transition from a current equivalent PLMN or a registered PLMN to another equivalent PLMN during movement (in operation 2h-15).

At this time, if the NAS layer device of the UE detects it, the NAS layer device may generate a NAS PDU and transmit the NAS PDU to the AS layer device in operation 2h-20. Further, the UE may provide a PLMN selected by the NAS layer of the UE to the AS layer device of the UE in operation 2h-20.

The UE may configure mo-Singling as a reason to resume the connection and may perform a connection resume process with the gNB. The RRC-inactive mode UE may perform a random access procedure and transmit an RRC message to the gNB, and the UE operation proposed therefor is described below in operation 2h-25. Specifically, the UE may perform at least one of the following operations in connection with transmission of an RRCResume Request message or an RRCResumeRequest1 message. Alternatively, the following operations may be omitted.

If a useFullResumeID field is signaled through system information (SIB 1), the UE may select RRCResumeRequest1 as a message to be transmitted to the gNB. The UE may configure resumeIdentity as a full UE connection resume identifier value (fullI-RNTI value). The fullI-RNTI value may be stored in the UE. The UE may transmit the RRCResumeRequest1 message including the resumeIdentity.

Otherwise, the UE may select an RRCResumeRequest as a message to be transmitted to the gNB. The UE may configure shortResumeIdentity as a partitioned UE connection resume identifier value (shortI-RNTI value). The UE may transmit an RRCResumeRequest message including shortResumeIdentity.

The UE may select mo-Signalling as a reason to resume the connection (resumeCause).

If higher layer devices or the NAS layer of the UE provide a PLMN, the PLMN selected by the higher layer devices or the NAS layer of the UE may be configured as a selectedPLMN-Identity on the basis of a PLMN-IdentityList included in SIB1. Accordingly, the UE may prepare to include an RRCResumeRequest message or an RRCResumeRequest1 message including the selectedPLMN-Identity.

The UE may calculate MAC-I and insert the MAC-I into the selected message.

The UE may reconstruct RRC configuration information and security context information on the basis of UE context except for cell group configuration information (cellGroupConfig). The UE context may be stored in the UE.

The UE updates a new KgNB security key on the basis of a current KgNB security key, an NH (NextHop) value, and an NCC value. The NCC value may be stored in the UE.

The UE may induce new security keys (K_RRCenc, K_RRC_int, K_UPint, and K_UPenc) to be used in an integrity protection and verification procedure and an encryption and decryption procedure using the newly updated KgNB security key.

The UE may resume the integrity protection and verification procedure by applying the updated security keys and a previously configured algorithm to all bearers except for SRB0 and then apply integrity verification and protection to transmitted and received data. This is to increase reliability and security of data transmitted and received from SRB1 or DRBs.

The UE may resume an encryption and decryption procedure by applying the updated security keys and a previously configured algorithm to all bearers except for SRB0 and then apply encryption and decryption to transmitted and received data. This is to increase reliability and security of data transmitted and received from SRB1 or DRBs.

The UE may reconstruct a PDCP status and reestablish PDCP entities for SRB1.

Further, the UE resumes SRB1. This is because an RRCResume message is received through SRB1 in response to an RRCResumeRequest message or an RRCResumeRequest1 message to be transmitted.

Thereafter, the higher layer of the UE may transmit the selected message to be transmitted to the gNB, that is, the RRCResumeRequest message or the RRCResumeRequest1 message to lower layer devices.

Accordingly, the UE may transmit the RRCResumeRequest message or the RRCResumeRequest1 message to the gNB. Further, the UE may transmit the RRCResumeRequest message or the RRCResumeRequest1 message and start a timer T319.

The UE may perform a random access procedure to perform a connection resume procedure with the gNB and transmit the RRCResumeRequest message or the RRCResumeRequest1 message to the gNB in operation 2h-25, and may receive an RRC connection resume message (RRCResume message) in response thereto in operation 2h-30. The UE operation proposed in such a case is described below in operation 2h-30. The UE may perform at least one of the following operations or the following operations may be omitted.

If the UE receives the RRCResume message, the UE stops the timer T319 according to transmission of the RRCResumeRequest message or the RRCResumeRequest1 message.

If full configuration information (fullConfig) is included in the RRCResume message, the UE performs a full configuration procedure. Otherwise, if the UE receives the RRCResume message, the UE may reconstruct the PDCP status and reset a COUNT value for SRB2 and all DRBs. The UE may reconstruct cell group configuration information (cellGroupConfig) on the basis of stored UE context. The UE indicates this to lower layer devices.

The UE may release the full UE connection resume identifier (FullI-RNTI), the partitioned UE connection resume identifier (Shord-RNTI), and the stored UE context. At this time, the UE does not release RAN notification area information (RAN-NotificationAreaInfo).

If master cell group (masterCellgroup) configuration information is included in the RRCResume message, the UE may perform a cell group configuration procedure according to configuration information.

If bearer configuration information (radioBearerConfig) is included in the RRCResume message, the UE may configure a bearer according to configuration information.

The UE may resume SRB2 and all DRBs.

If the UE stores cell reselection priority information, the UE may discard the information. The information may be cell reselection priority information, stored on the basis of CellReselectionPriorities that may be included in the RRCRelease message or received from another RAT.

If the timer T320 is being driven, the UE may stop it.

If frequency measurement configuration information (measConfig) is included in the RRCResume message, the UE may measure a frequency according to configuration information.

If the RRC connection is suspended, the UE may resume frequency measurement.

The UE transitions to the RRC-connected mode in operation 2h-35. Accordingly, the UE indicates to higher layer devices that the RRC connection, which had been suspended, is resumed. The UE may stop the cell reselection procedure. The UE may consider a currently accessed cell as a primary cell (PCell).

The UE transitioning to the RRC-connected mode may transmit an RRC connection resume completion message (RRCResumeComplete message) in operation 2h-40. Specifically, the UE may configure the RRCResumeComplete message as follows.

If a higher layer device provides a NAS PDU, the UE may insert the NAS PDU into a dedicatedNAS-Message.

If higher layer devices or the NAS layer provide a PLMN, the PLMN selected by the higher layer device or the NAS layer may be configured as a selectedPLMN-Identity on the basis of a PLMN-IdentityList included in SIB 1.

The gNB receiving the RRCResumeComplete message may transmit an RRCRelease message including suspend configuration information to the UE in operation 2h-45. Alternatively, if the UE does not receive the RRCRelease message including the suspend configuration information from the gNB in operation 2h-45, the UE may transmit and receive data to and from the gNB. Alternatively, the gNB may transmit another RRC message (for example, an RRCReject message or an RRCRelease message including no suspend configuration information) to the UE in operation 2h-45.

An embodiment of operation of the terminal according to an embodiment of the disclosure are as follows. The user equipment (UE) can reselect another equivalent PLMN in an inactive state, transmit, to a base station, a radio resource control (RRC) resume request message including resume cause configured to mo-signaling in case that a RAN-based notification area update procedure is triggered, and receive, from the base station, an RRC resume message.

An embodiment of operation of the base station according to an embodiment of the disclosure are as follows. The base station can receive, from a UE, a radio resource connection (RRC) resume request message including resume cause configured to mo-signaling in case that another equivalent PLMN is reselected by an inactive-state user equipment (UE) and a RAN-based notification area update procedure is triggered, and transmit, to the UE, an RRC resume message.

Figure 2I:
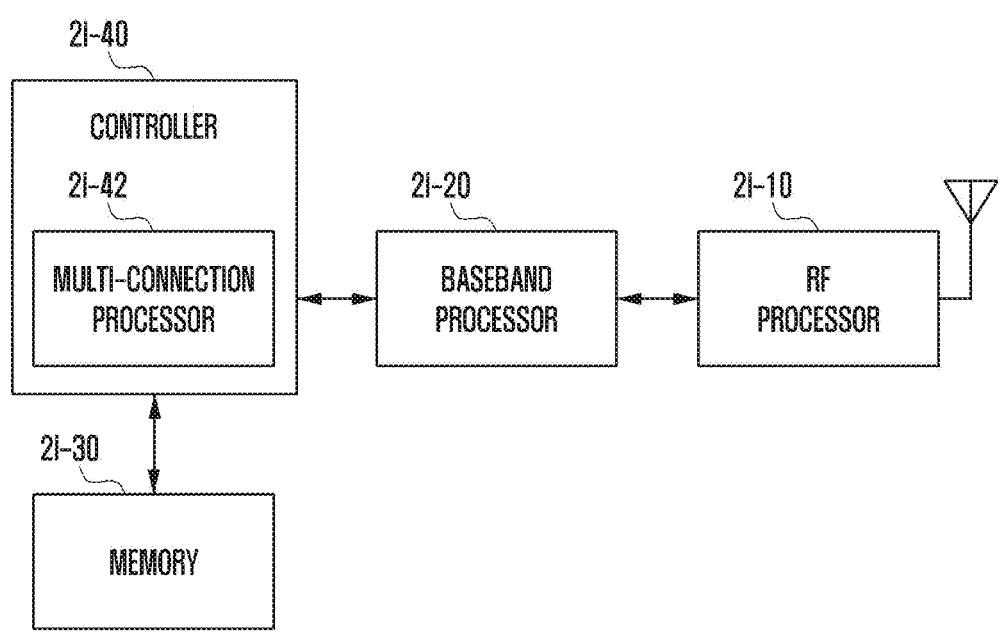
FIG. 2I is a block diagram illustrating an internal structure of a UE according to an embodiment of the disclosure.

FIG. 2I is a block diagram illustrating the internal structure of a UE according to an embodiment of the disclosure.

Referring to FIG. 2I, the UE includes a radio-frequency (RF) processor 2i-10, a baseband processor 2i-20, a memory 2i-30, and a controller 2i-40. The controller 2i-40 may include a multi-connection processor 2i-42 which performs a process for operating in a multiple connection mode.

The RF processor 2i-10 performs a function for transmitting and receiving a signal through a radio channel, such as band conversion and amplification of a signal. That is, the RF processor 2i-10 up-converts a baseband signal provided from the baseband processor 2i-20 into an RF band signal, transmits the RF band signal through an antenna, and then down-converts the RF band signal received through the antenna into a baseband signal. For example, the RF processor 2i-10 may include a transmission filter, a reception filter, an amplifier, a mixer, an oscillator, a digital-to-analog convertor (DAC), and an analog-to-digital convertor (ADC). Although FIG. 2I illustrates only one antenna, the UE may include a plurality of antennas. The RF processor 2i-10 may include a plurality of RF chains. Moreover, the RF processor 2i-10 may perform beamforming. For the beamforming, the RF processor 2i-10 may control a phase and a size of each signal transmitted and received through a plurality of antennas or antenna elements. The RF processor may perform MIMO and receive a plurality of layers when performing the MIMO operation.

The baseband processor 2i-20 performs a function for conversion between a baseband signal and a bitstream according to a physical layer standard of the system. For example, in data transmission, the baseband processor 2i-20 generates complex symbols by encoding and modulating a transmission bitstream. Further, in data reception, the baseband processor 2i-20 reconstructs a reception bitstream by demodulating and decoding a baseband signal provided from the RF processor 2i-10. For example, in an orthogonal frequency division multiplexing (OFDM) scheme, when data is transmitted, the baseband processor 2i-20 generates complex symbols by encoding and modulating a transmission bitstream, maps the complex symbols to subcarriers, and then configures OFDM symbols through an IFFT (inverse fast Fourier transform) operation and a CP (cyclic prefix) insertion. Further, when data is received, the baseband processor 2i-20 divides the baseband signal provided from the RF processor 2i-10 in units of OFDM symbols, reconstructs the signals mapped to the subcarriers through a fast Fourier transform (FFT) operation, and then reconstructs a reception bitstream through demodulation and decoding.

The baseband processor 2i-20 and the RF processor 2i-10 transmit and receive signals as described above. Accordingly, the baseband processor 2i-20 and the RF processor 2i-10 may be commonly called a transmitter, a receiver, a transceiver, or a communication unit. Further, at least one of the baseband processor 2i-20 and the RF processor 2i-10 may include a plurality of communication modules for supporting a plurality of different radio access technologies. In addition, at least one of the baseband processor 2i-20 and the RF processor 2i-10 may include different communication modules for processing signals in different frequency bands. For example, the different communication standards may include a WLAN (for example, IEEE 802.11) and a cellular network (for example, LTE). Further, the different frequency bands may include a super high frequency (SHF) (for example, 2. NRHz, NRhz) band and a millimeter (mm) wave (for example, 60 GHz) band.

The memory 2i-30 stores data such as a basic program, an application, and setting information for the operation of the UE. Particularly, the memory 2i-30 may store information related to a second access node performing wireless communication through a second radio access technology. The memory 2i-30 provides stored data in response to a request from the controller 2i-40.

The controller 2i-40 controls the overall operation of the UE. For example, the controller 2i-40 transmits and receives a signal through the baseband processor 2i-20 and the RF processor 2i-10. The controller 2i-40 records data in the memory 2i-30 and reads the data. To this end, the controller 2i-40 may include at least one processor. For example, the controller 2i-40 may include a communication processor (CP) that performs a control for communication, and an application processor (AP) that controls a higher layer such as an application.

Figure 2J:
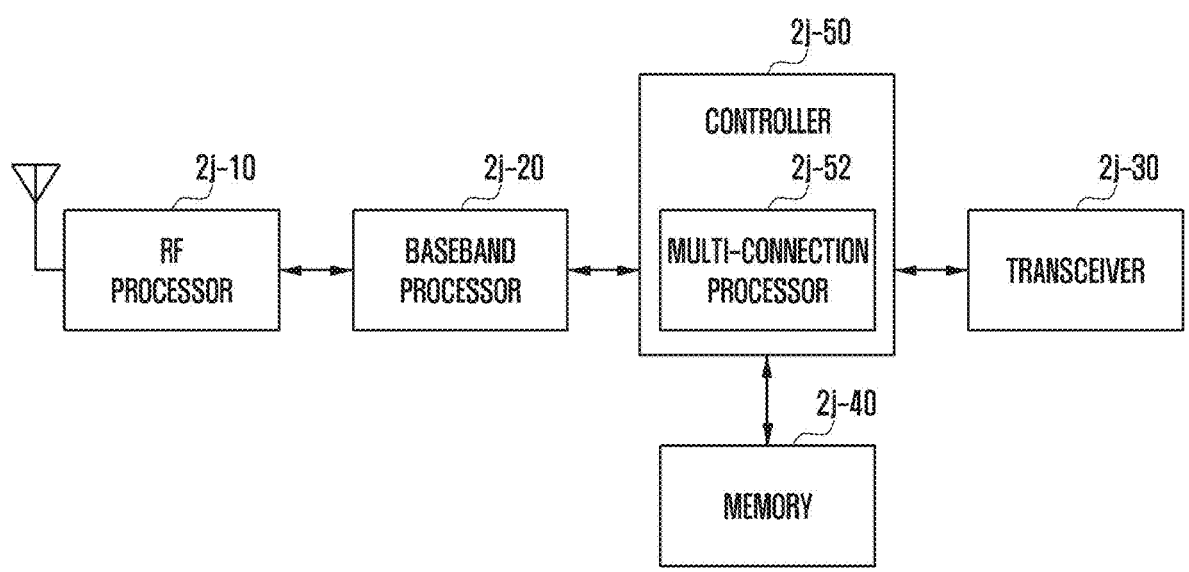
FIG. 2J is a block diagram illustrating the configuration of an NR base station according to an embodiment of the disclosure.

FIG. 2J is a block diagram illustrating the configuration of an NR gNB according to an embodiment of the disclosure.

Referring to FIG. 2J, the NR gNB includes an RF processor 2j-10, a baseband processor 2j-20, a backhaul transceiver 2j-30, a memory 2j-40, and a controller 2j-50. The controller 2j-50 may include a multi-connection processor 2j-52 which performs a process for operating in a multiple connection mode.

The RF processor 2j-10 performs a function for transmitting and receiving a signal through a wireless channel, such as band conversion and amplification of a signal. That is, the RF processor 2j-10 up-converts a baseband signal provided from the baseband processor 1j-20 into an RF band signal, transmits the RF band signal through an antenna, and then down-converts the RF band signal received through the antenna into a baseband signal. For example, the RF processor 2j-10 may include a transmission filter, a reception filter, an amplifier, a mixer, an oscillator, a DAC, and an ADC. Although FIG. 2J illustrates only one antenna, the base station may include a plurality of antennas. Further, the RF processor 2j-10 may include a plurality of RF chains. The RF processor 2j-10 may perform beamforming. For the beamforming, the RF processor 2j-10 may control a phase and a size of each signal transmitted and received through a plurality of antennas or antenna elements. The RF processor may perform a downlink MIMO operation by transmitting one or more layers.

The baseband processor 2j-20 performs a function of conversion between a baseband signal and a bitstream according to a physical-layer standard of the first radio access technology. For example, in data transmission, the baseband processor 2j-20 generates complex symbols by encoding and modulating a transmission bitstream. Further, in data reception, the baseband processor 2j-20 reconstructs a reception bitstream by demodulating and decoding a baseband signal provided from the RF processor 2j-10. For example, in an OFDM scheme, when data is transmitted, the baseband processor 2j-20 may generate complex symbols by encoding and modulating the transmission bitstream, map the complex symbols to subcarriers, and then configure OFDM symbols through an IFFT operation and CP insertion. In addition, when data is received, the baseband processor 2j-20 divides a baseband signal provided from the RF processor 2j-10 in units of OFDM symbols, recovers signals mapped with subcarriers through an FFT operation, and then recovers a reception bitstream through demodulation and decoding. The baseband processor 2j-20 and the RF processor 2j-10 transmit and receive signals as described above. Accordingly, the baseband processor 2j-20 and the RF processor 2j-10 may be commonly referred to as a transmitter, a receiver, a transceiver, a communication unit, or a radio communication unit.

The backhaul transceiver 2j-30 provides an interface for communicating with other nodes within the network. That is, the backhaul transceiver 2j-30 converts a bitstream transmitted to another node, for example, the SeNB or a core network from the MeNB, into a physical signal and converts a physical signal received from the other node into the bitstream.

The memory 2j-40 stores data such as a basic program, an application, or configuration information for the operation of the MeNB. Particularly, the memory 2j-40 may store information on a bearer allocated to the access UE and a measurement result reported by the accessed UE. The memory 2j-40 may store information which is a reference for determining whether or not to allow multiple connections to the UE. The memory 2j-40 provides stored data in response to a request from the controller 2j-50.

The controller 2j-50 controls the overall operation of the MeNB. For example, the controller 2j-50 transmits and receives a signal through the baseband processor 2j-20 and the RF processor 2j-10 or through the backhaul transceiver 1j-30. The controller 2j-50 records data in the memory 2j-40 and reads the data. To this end, the controller 2j-50 may include at least one processor.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a communication system, the method comprising:
   receiving, from a base station, a radio resource control (RRC) release message;
   entering an inactive state based on the RRC release message;
   reselecting a cell belonging to an equivalent public land mobile network (PLMN) of a registered PLMN and not belonging to the registered PLMN;
   transmitting, to a base station, an RRC resume request message including a resume cause configured to mobile originated (mo)-signaling;
   receiving, from the base station, an RRC resume message as a response to the RRC resume request message; and
   transmitting, to the base station, an RRC resume complete message as a response to the RRC resume message, the RRC resume complete message including a non-access stratum (NAS) protocol data unit (PDU) and an identifier of a reselected PLMN,
   wherein the resume cause is configured to mo-signaling based on reselection of the cell belonging to the equivalent PLMN of the registered PLMN and not belonging to the registered PLMN.

2. The method of claim 1, wherein the resume cause is configured to mo-signaling based on reselection of the cell belonging to the equivalent PLMN of the registered PLMN and not belonging to the registered PLMN, in case that a radio access network (RAN)-based notification area update procedure is triggered.

3. The method of claim 1, wherein, in case that the base station is shared in a plurality of networks, the equivalent PLMN corresponds to one of the plurality of networks.

4. The method of claim 2, wherein the RAN-based notification area update procedure is triggered in case that the UE is located in a RAN-based notification area which is not included in RAN indication area information configured to the UE.

5. The method of claim 1, wherein the RRC release message includes suspend configuration information.

6. A method performed by a base station in a communication system, the method comprising:
   transmitting, to a user equipment (UE), a radio resource control (RRC) release message;
   in case that a cell belonging to an equivalent public land mobile network (PLMN) of a registered PLMN and not belonging to the registered PLMN is reselected by the UE, receiving, from the UE, an RRC resume request message including a resume cause configured to mobile originated (mo)-signaling;

transmitting, to the UE, an RRC resume message as a response to the RRC resume request message; and receiving, from the UE, an RRC resume complete message as a response to the RRC resume message, the RRC resume complete message including a non-access stratum (NAS) protocol data unit (PDU) and an identifier of a reselected PLMN, wherein the resume cause is configured to mo-signaling based on reselection of the cell belonging to the equivalent PLMN of the registered PLMN and not belonging to the registered PLMN.

7. The method of claim 6, wherein the resume cause is configured to mo-signaling based on reselection of the cell belonging to the equivalent PLMN of the registered PLMN and not belonging to the registered PLMN, in case that a radio access network (RAN)-based notification area update procedure is triggered.

8. The method of claim 6, wherein, in case that the base station is shared in a plurality of networks, the equivalent PLMN corresponds to one of the plurality of networks.

9. The method of claim 7, wherein the RAN-based notification area update procedure is triggered in case that the UE is located in a RAN-based notification area which is not included in RAN notification area information configured for the UE.

10. The method of claim 6, wherein the RRC release message includes suspend configuration information.

11. A user equipment (UE) in a communication system, the UE comprising:

a transceiver; and at least one processor coupled with the transceiver and configured to:

receive, from a base station, a radio resource control (RRC) release message, enter an inactive state based on the RRC release message, reselect a cell belonging to an equivalent public land mobile network (PLMN) of a registered PLMN and not belonging to the registered PLMN, transmit, to a base station, an RRC resume request message including a resume cause configured to mobile originated (mo)-signaling, receive, from the base station, an RRC resume message as a response to the RRC resume request message, and transmit, to the base station, an RRC resume complete message as a response to the RRC resume message, the RRC resume complete message including a non-access stratum (NAS) protocol data unit (PDU) and an identifier of a reselected PLMN, wherein the resume cause is configured to mo-signaling based on reselection of the cell belonging to the equivalent PLMN of the registered PLMN and not belonging to the registered PLMN.

12. The UE of claim 11, wherein the resume cause is configured to mo-signaling based on reselection of the cell belonging to the equivalent PLMN of the registered PLMN and not belonging to the registered PLMN, in case that a radio access network (RAN)-based notification area update procedure is triggered.

13. The UE of claim 11, wherein, in case that the base station is shared in a plurality of networks, the equivalent PLMN corresponds to one of the plurality of networks.

14. The UE of claim 12, wherein the RAN-based notification area update procedure is triggered in case that the UE is located in a RAN-based notification area which is not included in RAN indication area information configured to the UE.

15. The UE of claim 11, wherein the RRC release message includes suspend configuration information.

16. A base station in a communication system, the base station comprising:

a transceiver; and at least one processor coupled with the transceiver and configured to:

transmit, to a user equipment (UE), a radio resource control (RRC) release message, in case that a cell belonging to an equivalent public land mobile network (PLMN) of a registered PLMN and not belonging to the registered PLMN is reselected by the UE, receive, from the UE, an RRC resume request message including a resume cause configured to mobile originated (mo)-signaling, transmit, to the UE, an RRC resume message as a response to the RRC resume request message, and receive, from the UE, an RRC resume complete message as a response to the RRC resume message, the RRC resume complete message including a non-access stratum (NAS) protocol data unit (PDU) and an identifier of a reselected PLMN, wherein the resume cause is configured to mo-signaling based on reselection of the cell belonging to the equivalent PLMN of the registered PLMN and not belonging to the registered PLMN.

17. The base station of claim 16, the wherein the resume cause is configured to mo-signaling based on reselection of the cell belonging to the equivalent PLMN of the registered PLMN and not belonging to the registered PLMN, in case that a radio access network (RAN)-based notification area update procedure is triggered.

18. The base station of claim 16, wherein, in case that the base station is shared in a plurality of networks, the equivalent PLMN corresponds to one of the plurality of networks.

19. The base station of claim 17, wherein the RAN-based notification area update procedure is triggered in case that the UE is located in a RAN-based notification area which is not included in RAN notification area information configured for the UE.

20. The base station of claim 17, wherein the RRC release message includes suspend configuration information.

* * * * *